(12) United States Patent
Elazzouni et al.

(10) Patent No.: US 12,144,028 B2
(45) Date of Patent: Nov. 12, 2024

(54) CONDITIONAL USE OF ALLOCATED PERIODIC RESOURCES

(71) Applicant: QUALCOMM Incorporated, San Diego, CA (US)

(72) Inventors: Sherif Elazzouni, San Diego, CA (US); Ozcan Ozturk, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/402,427

(22) Filed: Aug. 13, 2021

(65) Prior Publication Data
US 2023/0058614 A1    Feb. 23, 2023

(51) Int. Cl.
*H04W 74/0816* (2024.01)
*H04W 72/1263* (2023.01)
*H04W 76/15* (2018.01)
*H04W 76/18* (2018.01)
*H04W 92/18* (2009.01)

(52) U.S. Cl.
CPC ... *H04W 74/0816* (2013.01); *H04W 72/1263* (2013.01); *H04W 76/15* (2018.02); *H04W 76/18* (2018.02); *H04W 92/18* (2013.01)

(58) Field of Classification Search
CPC ......... H04W 74/0816; H04W 72/1263; H04W 76/15; H04W 76/18; H04W 92/18
See application file for complete search history.

(56) References Cited

U.S. PATENT DOCUMENTS

| | | | |
|---|---|---|---|
| 2018/0368174 A1* | 12/2018 | Jeon | H04W 72/044 |
| 2019/0254081 A1* | 8/2019 | Li | H04L 1/1607 |
| 2020/0259896 A1* | 8/2020 | Sachs | H04L 67/10 |
| 2020/0344747 A1* | 10/2020 | Park | H04W 72/21 |
| 2020/0351036 A1* | 11/2020 | Lee | H04L 1/1887 |
| 2021/0105096 A1* | 4/2021 | Chin | H04L 69/322 |
| 2021/0144750 A1* | 5/2021 | Cao | H04W 72/0453 |
| 2021/0250983 A1* | 8/2021 | Kunt | H04W 72/23 |
| 2022/0015132 A1* | 1/2022 | Sharma | H04W 72/1263 |

(Continued)

FOREIGN PATENT DOCUMENTS

WO    WO-2022131981 A1 *   6/2022

OTHER PUBLICATIONS

Le et al., "Improving Ultra-Reliable Low-Latency Communication in multiplexing with Enhanced Mobile Broadband in grant-free resources," 2019 IEEE 30th Annual International Symposium on Personal, Indoor and Mobile Radio Communications (PIMRC), Istanbul, Turkey, 2019, pp. 1-6 (Year: 2019).*

(Continued)

*Primary Examiner* — Un C Cho
*Assistant Examiner* — Lalita W Pace
(74) *Attorney, Agent, or Firm* — Loza & Loza, LLP

(57) ABSTRACT

Aspects relate to an allocation of periodic resources where use of the periodic resources is conditional. In some examples, a user equipment (UE) receives a periodic resource allocation along with an indication of a condition for using the periodic resources. For example, the UE may be allowed to transmit on at least one first resource of the periodic resources if the condition is true. Similarly, a base station (BS) may monitor for a transmission by the UE on the at least one first resource if the condition is true.

21 Claims, 30 Drawing Sheets

(56) References Cited

U.S. PATENT DOCUMENTS

| | | | | |
|---|---|---|---|---|
| 2022/0086861 A1* | 3/2022 | Zhao | .................. | H04W 72/569 |
| 2022/0140983 A1* | 5/2022 | Medina Acosta | ..... | H04L 5/0091 |
| | | | | 370/329 |
| 2022/0210823 A1* | 6/2022 | Alfarhan | ............... | H04L 1/1887 |
| 2022/0232618 A1* | 7/2022 | Awad | ................... | H04W 72/21 |
| 2022/0272714 A1* | 8/2022 | Bagheri | ............... | H04W 72/56 |
| 2022/0360414 A1* | 11/2022 | Liu | ........................ | H04L 1/188 |
| 2022/0417983 A1* | 12/2022 | Tsai | ................... | H04W 56/001 |
| 2023/0180291 A1* | 6/2023 | Du | ........................ | H04L 1/1812 |
| | | | | 370/329 |

OTHER PUBLICATIONS

Apple: "Reliability enhancements for CG/SPS", R2-2100857, 3GPP TSG-RAN WG2 Meeting #113-e, 3rd Generation Partnership Project, Mobile Competence Centre, 650, Route Des Lucioles, F-06921 Sophia-Antipolis Cedex, France, vol. RAN WG2, No. e-Meeting, Jan. 25-Feb. 5, 2021, Jan. 15, 2021, XP051973954, 14 Pages, page 1, line 4, paragraph 2.1-line 7, p. 2, line 1, paragraph 2.2-line 2, p. 3, line 5-6, p. 6, line 1, paragraph 3.2-line 4, p. 6, line 8, paragraph 3.2-p. 7, line 10-12, p. 7, line 20-23, p. 7, line 25-26, figures 5, 6.

Ericsson: "RAN Enhancements Based on New QoS Related Parameters", 3GPP TSG-RAN WG2 #115e, R2-2108099, 3rd Generation Partnership Project, Mobile Competence Centre, 650, Route Des Lucioles, F-06921 Sophia-Antipolis Cedex, France, vol. RAN WG2, No. Electronic meeting, Aug. 9-27, 2021, Aug. 5, 2021, XP052032459, pp. 1-5, p. 1, paragraph 2-p. 3.

International Search Report and Written Opinion—PCT/US2022/036703—ISA/EPO—Sep. 23, 2022.

* cited by examiner

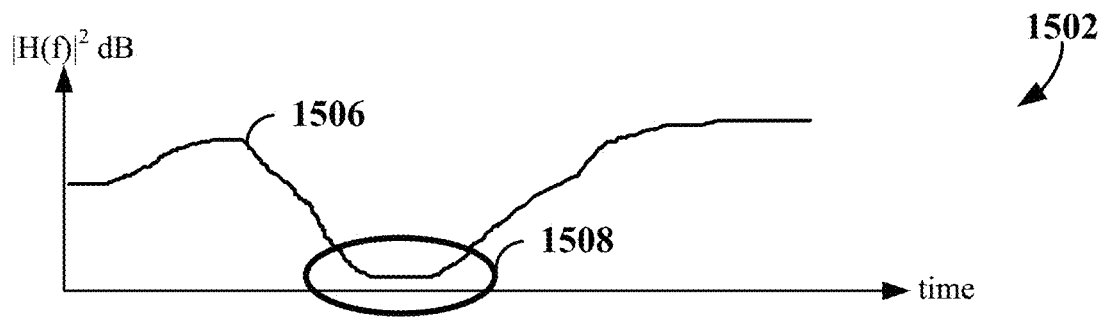
Low RSRP reported by UE to gNB
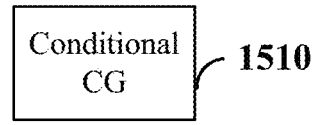
RSRP condition FALSE =>
known by UE & gNB =>
CG Not active
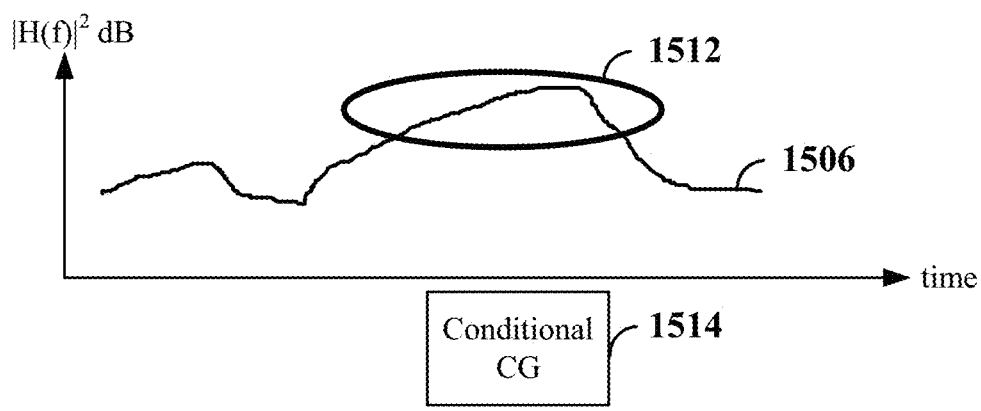
RSRP condition TRUE =>
known by UE & gNB =>
CG active
FIG. 15

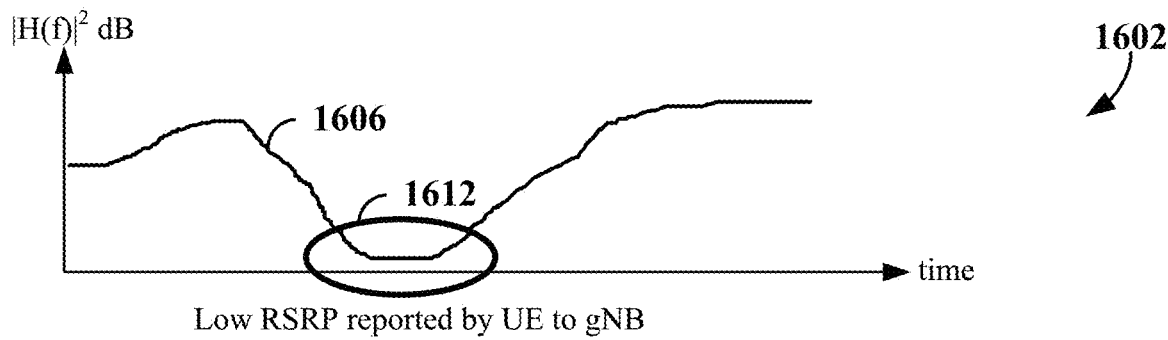
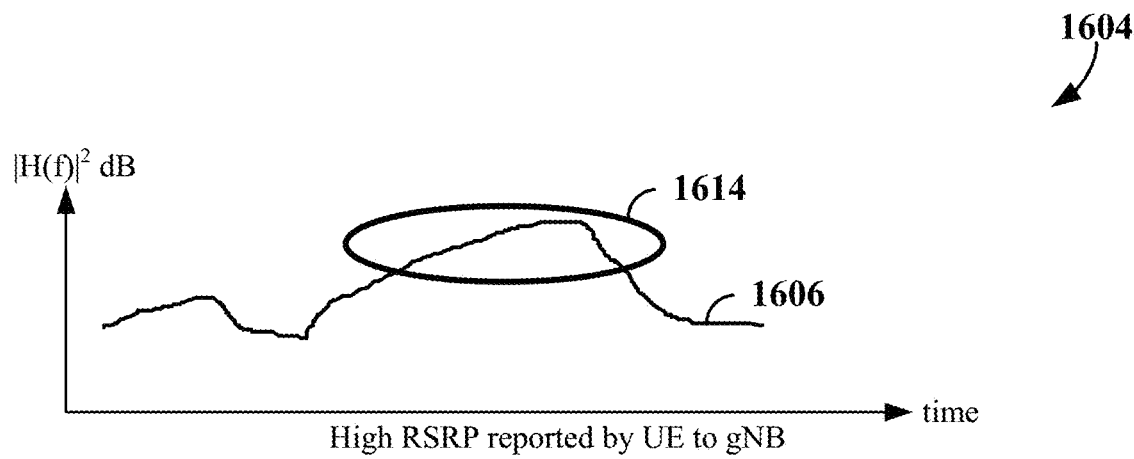
FIG. 16

```
ConfiguredGrantConfig ::=         SEQUENCE {
  frequencyHopping                  ENUMERATED {intraSlot, interSlot}                    OPTIONAL,   -- Need S
  cg-DMRS-Configuration             DMRS-UplinkConfig,
  mcs-Table                         ENUMERATED {qam256, qam64LowSE}                      OPTIONAL,   -- Need S
  mcs-TableTransformPrecoder        ENUMERATED {qam256, qam64LowSE}                      OPTIONAL,   -- Need S
  uci-OnPUSCH                       SetupRelease { CG-UCI-OnPUSCH }                      OPTIONAL,   -- Need M
  resourceAllocation                ENUMERATED { resourceAllocationType0, resourceAllocationType1, dynamicSwitch },
  rbg-Size                          ENUMERATED {config2}                                 OPTIONAL,   -- Need S
  powerControlLoopToUse             ENUMERATED {n0, n1},
  p0-PUSCH-Alpha                    P0-PUSCH-AlphaSetId,
  transformPrecoder                 ENUMERATED {enabled, disabled}                       OPTIONAL,   -- Need S
  nrofHARQ-Processes                INTEGER(1..16),
  repK                              ENUMERATED {n1, n2, n4, n8},
  repK-RV                           ENUMERATED {s1-0231, s2-0303, s3-0000}               OPTIONAL,   -- Need R
  periodicity                       ENUMERATED {
      sym2, sym7, sym1x14, sym2x14, sym4x14, sym5x14, sym8x14, sym10x14, sym16x14, sym20x14,sym32x14,
sym40x14, sym64x14, sym80x14, sym128x14, sym160x14, sym256x14, sym320x14, sym512x14, sym640x14, sym1024x14, sym1280x14, sym2560x14, sym5120x14,
sym6, sym1x12, sym2x12, sym4x12, sym5x12, sym8x12, sym10x12, sym16x12, sym20x12, sym32x12, sym40x12, sym64x12, sym80x12, sym128x12, sym160x12,
sym256x12, sym320x12, sym512x12, sym640x12, sym1280x12, sym2560x12
  },
  configuredGrantTimer              INTEGER (1..64)                                      OPTIONAL,   -- Need R
  rrc-ConfiguredUplinkGrant         SEQUENCE {
      timeDomainOffset                 INTEGER (0..5119),
      timeDomainAllocation             INTEGER (0..15),
      frequencyDomainAllocation        BIT STRING (SIZE(18)),
      antennaPort                      INTEGER (0..31),
      dmrs-SeqInitialization           INTEGER (0..1),
      precodingAndNumberOfLayers       INTEGER (0..63),
      srs-ResourceIndicator            INTEGER (0..15),
      mcsAndTBS                        INTEGER (0..31),
      frequencyHoppingOffset           INTEGER (1.. maxNrofPhysicalResourceBlocks-1)     OPTIONAL,   -- Need R
      pathlossReferenceIndex           INTEGER (0..maxNrofPUSCH-PathlossReferenceRSs-1),
  },
  [[
  pusch-RepTypeIndicator-r16        ENUMERATED {pusch-RepTypeA,pusch-RepTypeB}           OPTIONAL,   -- Need M
  frequencyHoppingPUSCH-RepTypeB-r16 ENUMERATED {interRepetition, interSlot}             OPTIONAL,   -- CondRepTypeB
  timeReferenceSFN-r16              ENUMERATED {sfn512}                                  OPTIONAL,   -- Need S
  ]]
  ...
  ...                                                                                    OPTIONAL,   -- Need R
}
```

FIG. 21

```
cg-RetransmissionTimer-r16        INTEGER (1..64)                                            OPTIONAL,  -- Need R
cg-minDFI-Delay-r16               ENUMERATED
                                  {sym7, sym1x14, sym2x14, sym3x14, sym4x14, sym5x14, sym6x14, sym7x14,
                                  sym8x14, sym9x14, sym10x14, sym11x14, sym12x14, sym13x14,
                                  sym14x14,sym15x14, sym16x14 cg-nrofPUSCH-InSlot-r16           INTEGER (1..7)                                             OPTIONAL,  -- Need R
cg-nrofSlots-r16                  INTEGER (1..40)                                            OPTIONAL,  -- Need R
cg-StartingOffsets-r16            CG-StartingOffsets-r16                                     OPTIONAL,  -- Need R
cg-UCI-Multiplexing-r16           ENUMERATED {enabled}                                       OPTIONAL,  -- Need R
cg-COT-SharingOffset-r16          INTEGER (1..39)                                            OPTIONAL,  -- Need R
betaOffsetCG-UCI-r16              INTEGER (0..31)                                            OPTIONAL,  -- Need R
cg-COT-SharingList-r16            SEQUENCE (SIZE (1..1709)) OF CG-COT-Sharing-r16            OPTIONAL,  -- Need R
harq-ProcID-Offset-r16            INTEGER (0..15)                                            OPTIONAL,  -- Need M
harq-ProcID-Offset2-r16           INTEGER (0..15)                                            OPTIONAL,  -- Need M
configuredGrantConfigIndex-r16    ConfiguredGrantConfigIndex-r16                             OPTIONAL,  -- Cond CG-List
configuredGrantConfigIndexMAC-r16 ConfiguredGrantConfigIndexMAC-r16                          OPTIONAL,  -- Cond CG-IndexMAC
periodicityExt-r16                INTEGER (1..5120)                                          OPTIONAL,  -- Need R
startingFromRV0-r16               ENUMERATED {on, off}                                       OPTIONAL,  -- Need R
phy-PriorityIndex-r16             ENUMERATED {p0, p1}                                        OPTIONAL,  -- Need R
autonomousTx-r16                  ENUMERATED {enabled}                                       OPTIONAL,  -- Cond LCH-BasedPrioritization
]]
~--
Conditional_CG_Condition::= SEQUENCE {
    cg-failure               INTEGER (1..8)
    rsrp-threshold-low       INTEGER (RSRP_threshold_below)                                  OPTIONAL
    rsrp-threshold-high      INTEGER (RSRP_threshold_above)                                  OPTIONAL
    paylod-threshold-low     INTEGER (Paylod_threshold_below)                                OPTIONAL
    paylod-threshold-high    INTEGER (Paylod_threshold_above)                                OPTIONAL
}
~--
```

FIG. 22

```
CG-UCI-OnPUSCH ::= CHOICE {
    dynamic            SEQUENCE (SIZE (1..4)) OF BetaOffsets,
    semiStatic         BetaOffsets
}

CG-COT-Sharing-r16 ::= CHOICE {
    noCOT-Sharing-r16   NULL,
    cot-Sharing-r16     SEQUENCE {
        duration-r16            INTEGER (1..39),
        offset-r16              INTEGER (1..39),
        channelAccessPriority-r16  INTEGER (1..4)
    }
}

CG-StartingOffsets-r16 ::= SEQUENCE {
    cg-StartingFullBW-InsideCOT-r16     SEQUENCE (SIZE (1..7)) OF INTEGER (0..6)   OPTIONAL,  -- Need R
    cg-StartingFullBW-OutsideCOT-r16    SEQUENCE (SIZE (1..7)) OF INTEGER (0..6)   OPTIONAL,  -- Need R
    cg-StartingPartialBW-InsideCOT-r16  INTEGER (0..6)                             OPTIONAL,  -- Need R
    cg-StartingPartialBW-OutsideCOT-r16 INTEGER (0..6)                             OPTIONAL   -- Need R
}

-- TAG-CONFIGUREDGRANTCONFIG-STOP

-- ASN1STOP
```

FIG. 23

CONDITIONAL USE OF ALLOCATED PERIODIC RESOURCES

TECHNICAL FIELD

The technology discussed below relates generally to wireless communication and, more particularly, to conditionally allowing use of a periodic resource allocation.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving scheduling information allocating a plurality of periodic resources for the user equipment, receiving an indication of a condition that controls use of the plurality of periodic resources, and selectively transmitting data on at least one first resource of the plurality of periodic resources based on whether the condition is met.

In some examples, a user equipment may include a transceiver, a memory, and a processor coupled to the transceiver and the memory. The processor and the memory may be configured to receive, via the transceiver, scheduling information allocating a plurality of periodic resources for the user equipment, receive, via the transceiver, an indication of a condition that controls use of the plurality of periodic resources, and selectively transmit data, via the transceiver, on at least one first resource of the plurality of periodic resources based on whether the condition is met.

In some examples, a user equipment may include means for receiving scheduling information allocating a plurality of periodic resources for the user equipment, means for receiving an indication of a condition that controls use of the plurality of periodic resources, and means for selectively transmitting data on at least one first resource of the plurality of periodic resources based on whether the condition is met.

In some examples, an article of manufacture for use by a user equipment includes a non-transitory computer-readable medium having stored therein instructions executable by one or more processors of the user equipment to receive scheduling information allocating a plurality of periodic resources for the user equipment, receive an indication of a condition that controls use of the plurality of periodic resources, and selectively transmit data on at least one first resource of the plurality of periodic resources based on whether the condition is met.

In some examples, a method for wireless communication at a base station is disclosed. The method may include transmitting scheduling information allocating a plurality of periodic resources for a first user equipment, transmitting an indication of a condition that controls use of the plurality of periodic resources, and selectively receiving data on at least one first resource of the plurality of periodic resources based on whether the condition is met.

In some examples, a base station may include a transceiver, a memory, and a processor coupled to the transceiver and the memory. The processor and the memory may be configured to transmit, via the transceiver, scheduling information allocating a plurality of periodic resources for a first user equipment, transmit, via the transceiver, an indication of a condition that controls use of the plurality of periodic resources, and selectively receive data, via the transceiver, on at least one first resource of the plurality of periodic resources based on whether the condition is met.

In some examples, a base station may include means for transmitting scheduling information allocating a plurality of periodic resources for a first user equipment, means for transmitting an indication of a condition that controls use of the plurality of periodic resources, and means for selectively receiving data on at least one first resource of the plurality of periodic resources based on whether the condition is met.

In some examples, an article of manufacture for use by a base station includes a non-transitory computer-readable medium having stored therein instructions executable by one or more processors of the base station to transmit scheduling information allocating a plurality of periodic resources for a first user equipment, transmit an indication of a condition that controls use of the plurality of periodic resources, and selectively receive data on at least one first resource of the plurality of periodic resources based on whether the condition is met.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 15 is a diagram illustrating an example of a signal strength condition according to some aspects.

FIG. 16 is a diagram illustrating additional examples of a signal strength condition according to some aspects.

FIGS. 21-23 illustrate an example of a conditional configured grant configuration.

DETAILED DESCRIPTION

Figure 1:
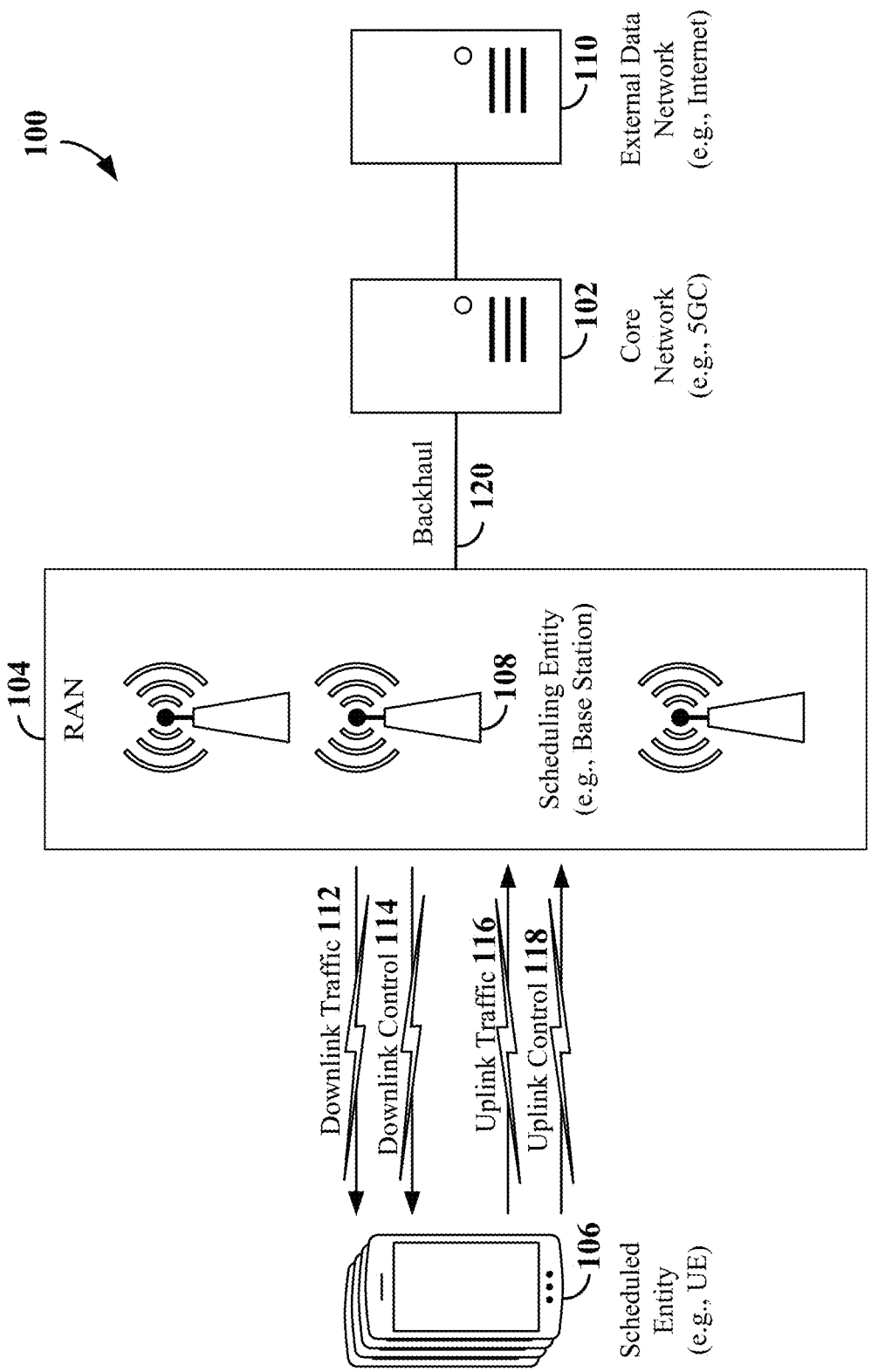
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates in some aspects to an allocation of periodic resources where use of the periodic resources is conditional. In some examples, a user equipment (UE) receives a periodic resource allocation along with an indication of a condition for using the periodic resources. For example, the UE may be allowed to transmit on at least one first resource of the periodic resources if the condition is true. Similarly, a base station (BS) may monitor for a transmission by the UE on the at least one first resource if the condition is true.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or downlink traffic 112 and/or uplink traffic 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 milliseconds) for wireless transmissions, with each frame consisting of, for example, 10 subframes of 1 millisecond (ms) each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
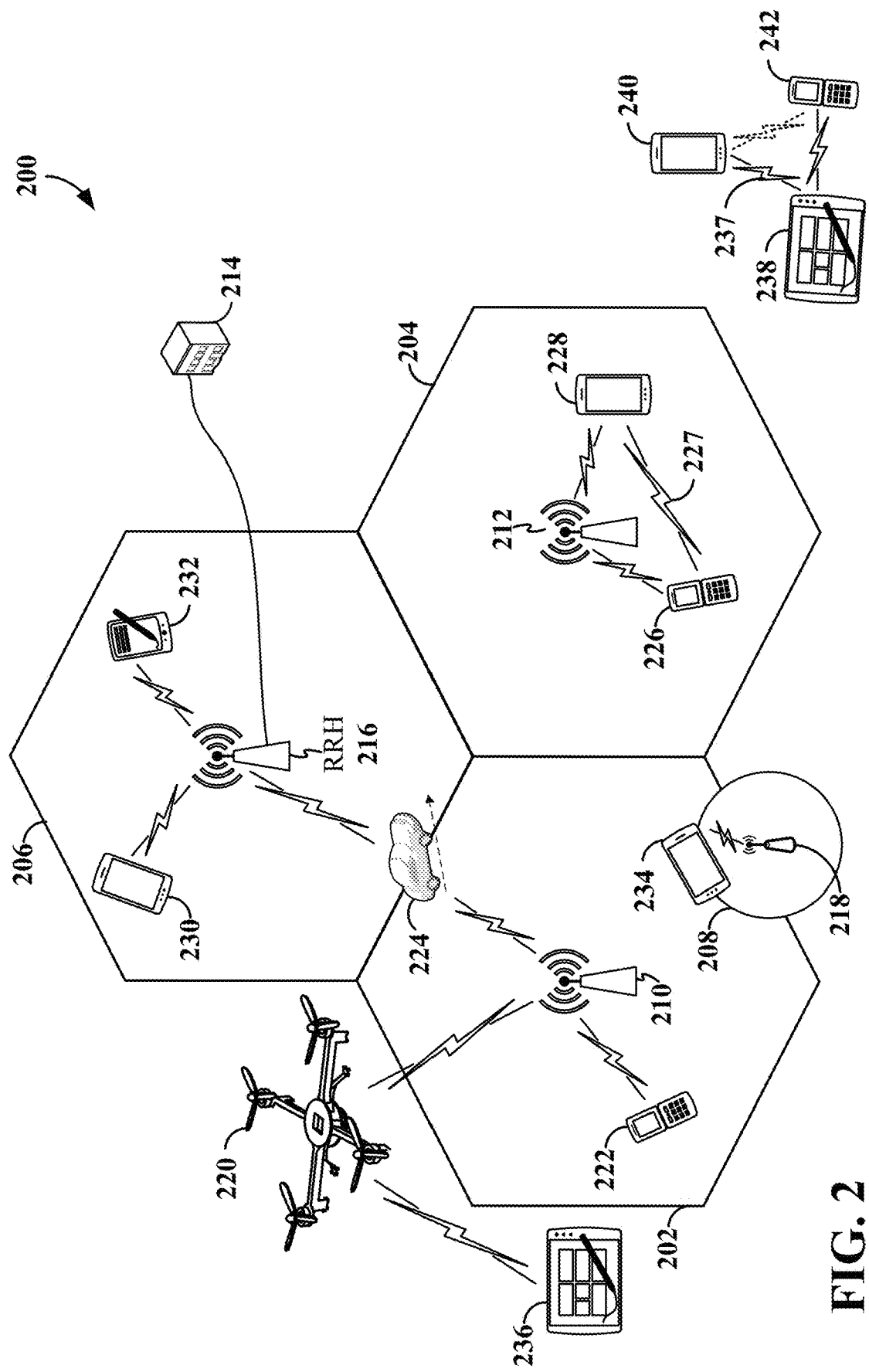
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
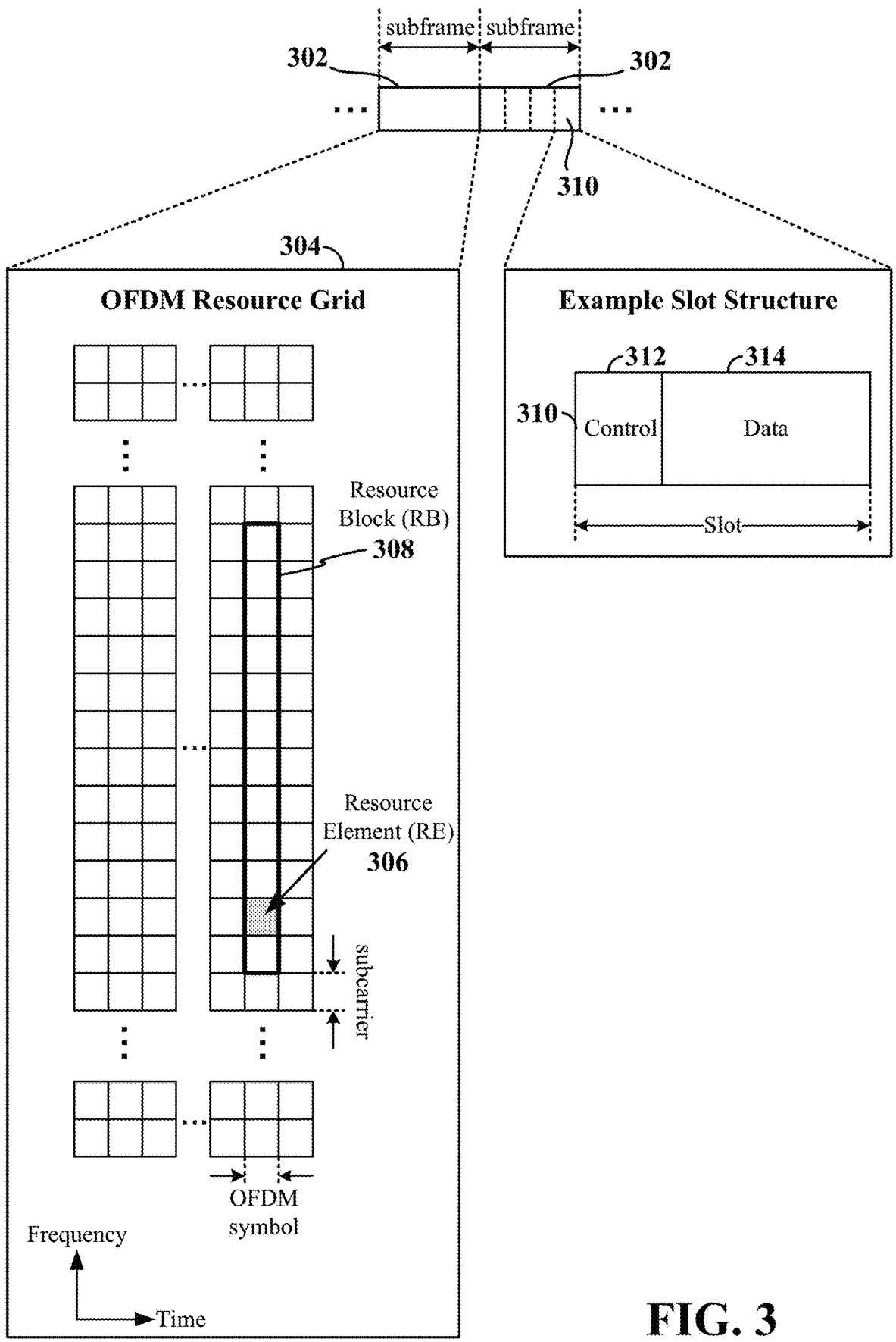
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

As mentioned above, a base station may send an UL grant or a DL grant to a UE. An UL grant may specify, for example, which resource blocks and/or which modulation and coding scheme (MCS) the BS has allocated to the UE for an UL transmission. A DL grant may specify, for example, which resource blocks and/or which MCS the BS will use for a DL transmission. Different types of grants may be used in different examples.

For a dynamic grant, a base station may send a DCI to a UE to schedule an individual transmission or reception (e.g., on physical downlink shared channel (PDSCH) or a physical uplink shared channel (PUSCH)). For example, after a UE requests uplink resources, a base station may send a first DCI to schedule a first PUSCH transmission by the UE. Then, after a UE requests additional uplink resources, the base station may send a second DCI to schedule a second PUSCH transmission, and so on.

For a configured grant (also referred to as a grant-free scheduling), a base station may configure uplink resources without having received a request for uplink resources from a UE. For example, the base station may send a DCI or a radio resource control (RRC) message to indicate that certain uplink resources (e.g., periodic resources) have been pre-configured. In some implementations, a base station may send a DCI or an RRC message to activate or deactivate a configured grant.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., receive (Rx) V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some scenarios, devices that transmit over unlicensed spectrum (or shared spectrum) may use a collision avoidance scheme to reduce the possibility that multiple devices will transmit over the same band at the same time. One example of such a collision avoidance scheme is a listen-before-talk (LBT) procedure. In general, before a first device transmits on a resource, the first device may listen for transmissions by another device. If the resource is currently being used, the first device may back-off for a period of time and then re-attempt transmission (e.g., by listening for other transmissions again). Carrier sense multiple access (CSMA) is one example of an LBT procedure. Other types of LBT procedures may be used as well.

Different types of LBT procedures may be defined according to different categories. For example, Category 1 (Cat. 1) LBT specifies that LBT is not used. Cat. 2 LBT specifies the use of LBT without random back-off. Cat. 3 LBT specifies the use of LBT with random back-off with a fixed size contention window. Cat. 4 LBT specifies the use of LBT with random back-off with a variable sized contention window.

NR operation in an unlicensed band and/or a shared band may be referred to as NR-U. Under NR-U, some transmissions may be subject to LBT. For example, under NR-U, a gNB's transmission of discovery reference signals (DRSs) such as the SSB discussed above may be subject to LBT.

5G-NR networks may support carrier aggregation (CA) of component carriers (CCs) transmitted from different cells and/or different transmission and reception points (TRPs) in a multi-cell transmission environment. The different TRPs may be associated with a single serving cell or multiple serving cells. In some aspects, the term component carrier (CC) may refer to a carrier frequency (or band) utilized for communication within a cell.

Figure 4:
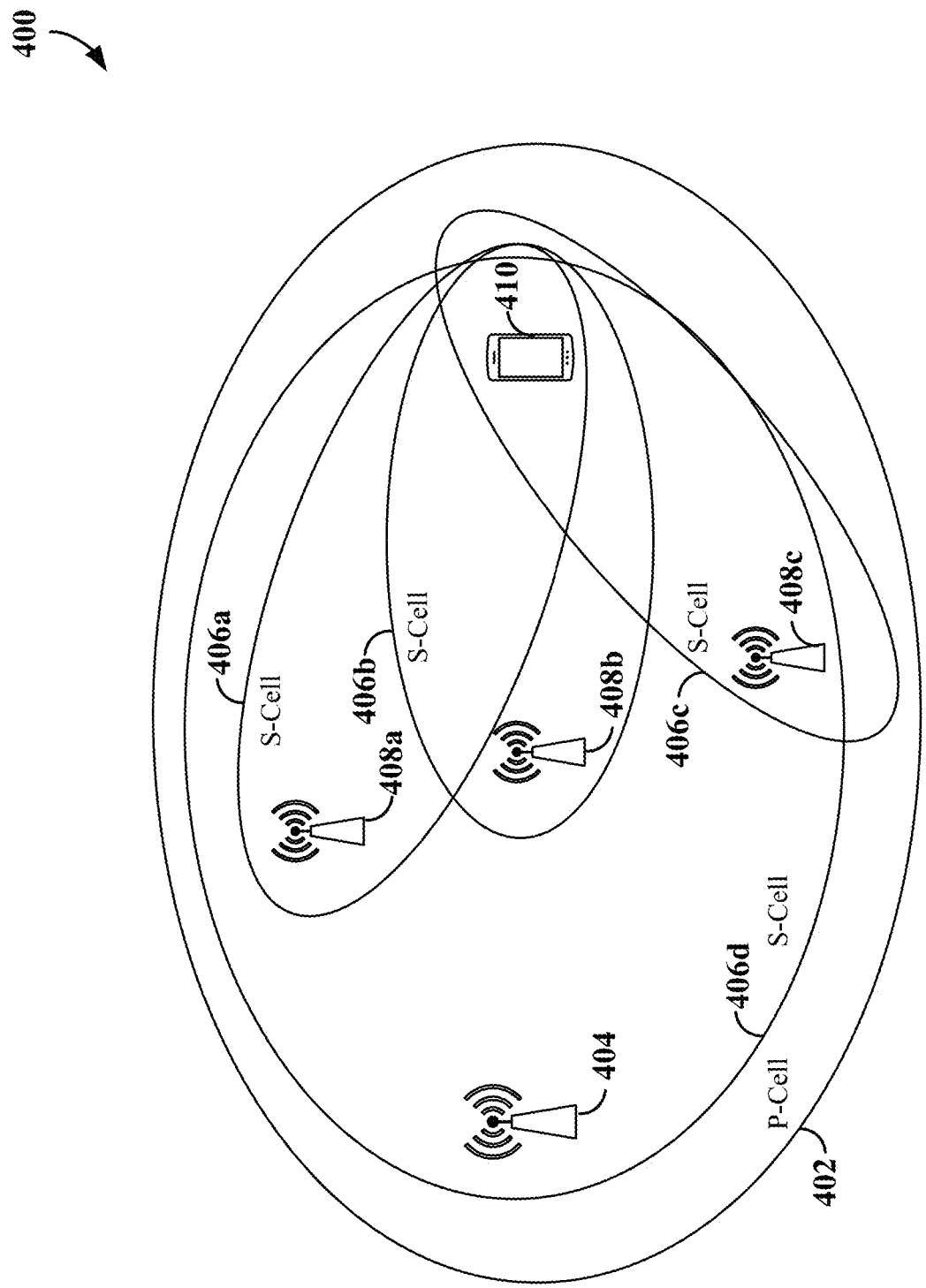
FIG. 4 is a conceptual illustration of a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406a, 406b, 406c, and 406d. The PCell 402 may be referred to as the anchor cell that provides a radio resource control (RRC) connection to a UE (e.g., a UE 410).

When carrier aggregation is configured in the multi-cell transmission environment 400, one or more of the SCells 406a-406d may be activated or added to the PCell 402 to form the serving cells serving the UE 410. In this case, each of the serving cells corresponds to a component carrier (CC). The CC of the PCell 402 may be referred to as a primary CC, and the CC of an SCell 406a-406d may be referred to as a secondary CC. In some examples, the UE 410 may correspond to any of the UEs or scheduled entities shown in any one or more of FIGS. 1, 2, 7, 8, 9, 10, 11, and 12.

Each of the PCell 402 and the SCells 406a-406d may be served by a transmission and reception point (TRP). For example, the PCell 402 may be served by a TRP 404 and each of the SCells 406a-406c may be served by a respective TRP 408a-408c. Each TRP 404 and 408a-408c may be a base station (e.g., gNB), remote radio head of a gNB, or other scheduling entity similar to those illustrated in any one or more of FIGS. 1, 2, 7, 8, 9, 10, and 11. In some examples, the PCell 402 and one or more of the SCells (e.g., the SCell 406d) may be co-located. For example, a TRP for the PCell 402 and a TRP for the SCell 406d may be installed at the same geographic location. Thus, in some examples, a TRP (e.g., the TRP 404) may include multiple TRPs, each corresponding to one of a plurality of co-located antenna arrays, and each supporting a different carrier (different CC). However, the coverage of the PCell 402 and the SCell 406d may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., the SCell 406a) for multi-cell communication with the UE 410 to improve the reliability of the connection to the UE 410 and/or to increase the data rate. In some examples, the PCell may activate the SCell 406a on an as-needed basis (instead of maintaining the SCell activation when the SCell 406a is not utilized for data transmission/reception) to reduce power consumption by the UE 410.

In some examples, the PCell 402 may be a low band cell, and the SCells 406 may be high band cells. A low band cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In these examples, the multi-cell transmission environment may be referred to as a Multi-RAT-Dual Connectivity (MR-DC) environment. One example of MR-DC is an Evolved-Universal Terrestrial Radio Access Network-New Radio Dual Connectivity (EN-DC) mode that enables a UE to simultaneously connect to an LTE base station and a NR base station to receive data packets from and send data packets to both the LTE base station and the NR base station.

Figure 5:
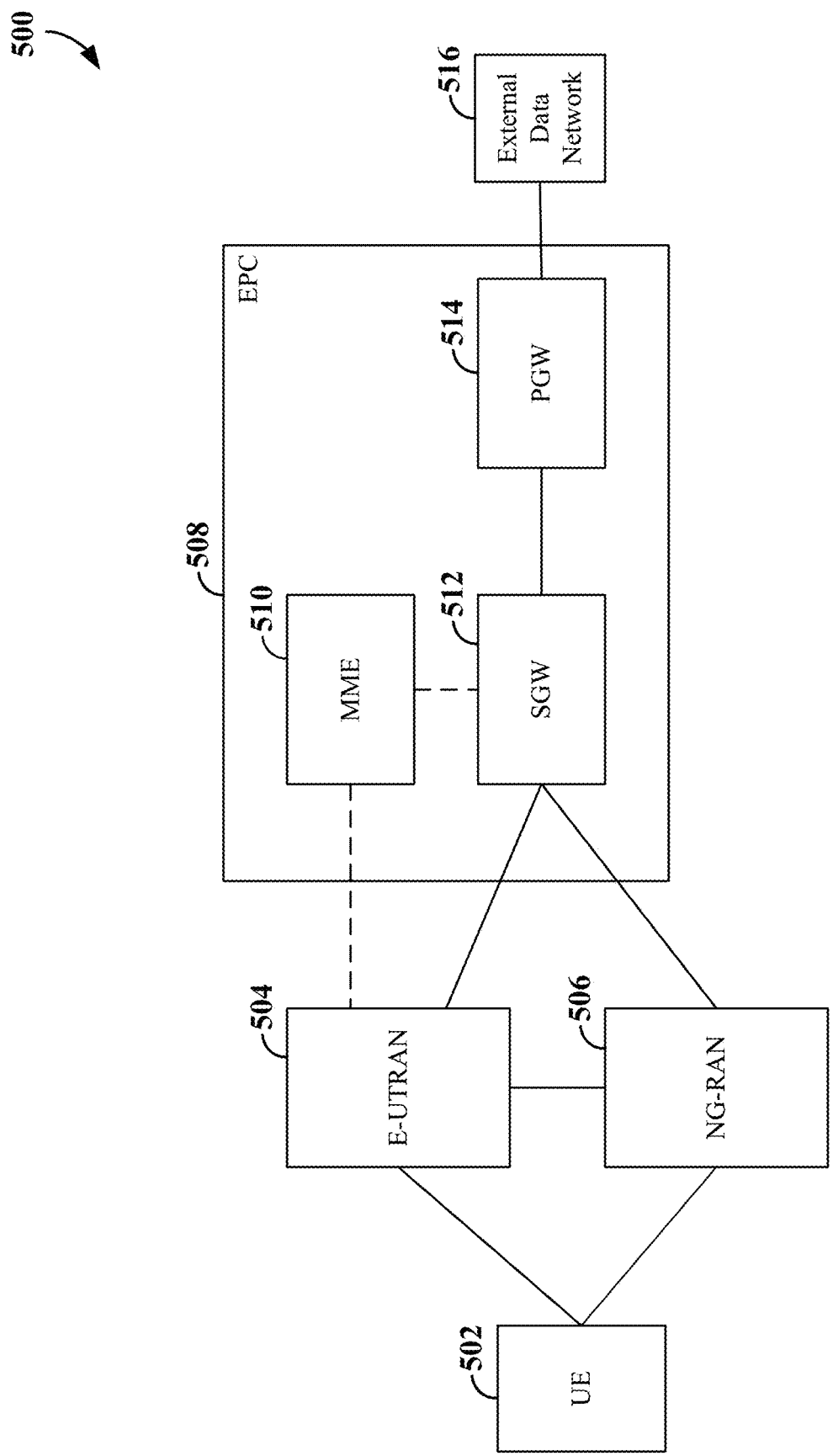
FIG. 5 is a block diagram illustrating a wireless communication system supporting dual connectivity according to some aspects.

Referring now to FIG. 5, by way of example and without limitation, a block diagram illustrating an example of various components of an EN-DC system 500 is provided. In some examples, the EN-DC system 500 may be the same wireless communication system 100 described above and illustrated in FIG. 1. The EN-DC system 500 includes a user equipment (UE) 502, a NG-RAN (e.g., an NG-RAN gNB 506), an LTE RAN (e.g., an E-UTRAN eNB 504), and a core network (e.g., an Evolved Packet Core (EPC 508)). By virtue of the EN-DC system 500, the UE 502 may be enabled to carry out data communication with an external data network (DN) 516, such as (but not limited to) the Internet, Ethernet network, or a local area network.

The EPC 508 may include, for example, a mobility management entity (MME) 510, a serving gateway (SGW) 512 and a packet data network gateway (PGW) 514. The MME 510 is the control node that processes the signaling between the UE 502 and the EPC 508. Generally, the MME 510 provides bearer and connection management for the UE 502 according to mechanisms defined for the EPC 508. For example, the MME 510 may manage security when the UE 502 connects to the E-UTRAN eNB 504 by using information provided by a Home Subscriber Server (HSS) (not shown in FIG. 5) to authenticate UEs and update UEs location information in the HSS. The MME 510 may further maintain the tracking area identity (TAI) of the current tracking area (e.g., group of neighboring cells/eNBs) within which the UE 502 is located to enable paging of the UE 502 when the UE is in idle mode. Moreover, the MME 510 may manage connectivity via packet data network (PDN) connections between the UE 502 and the PGW 514, and determine and provide a set of Quality of Service (QoS) parameters to the E-UTRAN 504.

To establish a connection to the EPC 508 via the E-UTRAN eNB 504, the UE 502 may transmit a registration request and PDN session establishment request to the EPC 508 via the E-UTRAN eNB 504. The MME 510 may process the registration request and PDN session establishment request and establish a PDN session between the UE 502 and the external DN 516 via the SGW 512 and PGW 514.

To enable dual connectivity, the 5G LTE infrastructure (e.g., E-UTRAN eNB 504 and EPC 508) supports a connection to the NG-RAN gNB 506. Here, the NG-RAN gNB 506 connects to the EPC 508 at the data plane level through the SGW 512. The NG-RAN gNB 506 does not connect to the MME 510, and as such, does not have a control plane connection to the EPC 508. The NG-RAN gNB 506 connects to the E-UTRAN eNB 504 to activate and deactivate 5G bearers. Therefore, the E-UTRAN eNB 504 acts as an anchor or master node and the NG-RAN gNB 506 acts as a secondary node. Here, the E-UTRAN eNB 504 may be configured for communication with the UE 502 using an LTE frequency band, while the NG-RAN gNB 506 may be configured for communication with the UE 502 using a NR frequency band (e.g., FR1 or FR2).

In an example, after the UE 502 camps on the E-UTRAN eNB 504, the UE can signal to the EPC 508 (e.g., the MME 510) that the UE 502 is capable of simultaneous connection to both the E-UTRAN eNB 504 and NG-RAN gNB 506. The MME 510 confirms that the UE 502 is authorized for dual connectivity and notifies the E-UTRAN eNB 504 that the UE 502 is permitted to connect to the NG-RAN gNB 506. The E-UTRAN eNB 504 may then communicate with the NG-RAN gNB 506 to activate a bearer on the NG-RAN gNB 506. The UE 502 can then receive a radio resource control (RRC) reconfiguration message assigning the 5G bearer to the UE 502. The UE 502 can then access the NG-RAN gNB 506 using a random access procedure to establish simultaneous dual connectivity to both the E-UTRAN eNB 504 and NG-RAN gNB 506. Additional secondary nodes (e.g., other gNBs) may also be added using a similar procedure.

Figure 6:
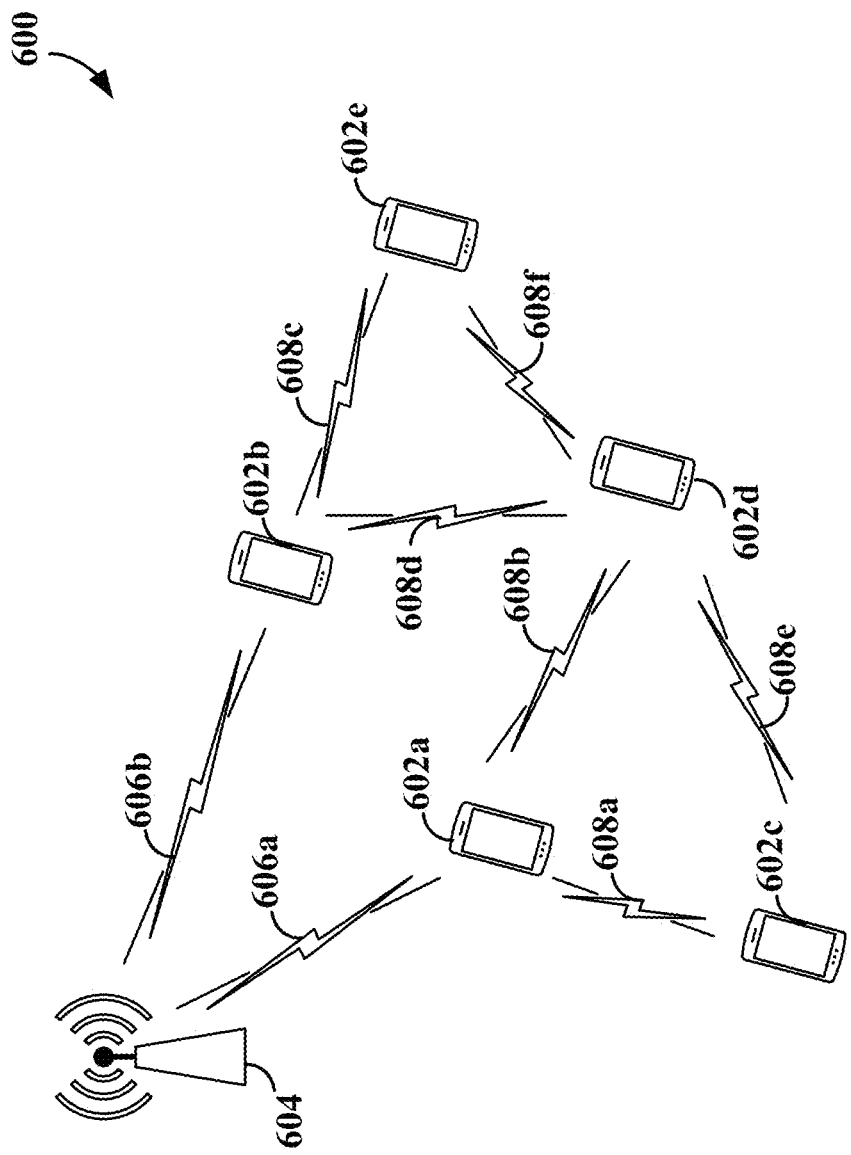
FIG. 6 is a diagram illustrating an example of a wireless communication network employing sidelink communication according to some aspects.

FIG. 6 is a diagram illustrating an exemplary wireless communication network 600 employing D2D or sidelink relaying. The wireless communication network 600 may correspond, for example, to the wireless communication system 100 illustrated in FIG. 1. The wireless communication network 600 may include a network entity 604 (e.g., a base station, eNB, or gNB) in wireless communication with one or more wireless communication devices (e.g., UEs 602a, 602b, 602c, 602d, and 602e). In the example shown in FIG. 6, the network entity 604 may communicate with at least UEs 602a and 602b via a respective Uu wireless communication link 606a and 606b. In some examples, the network entity 604 may further have a Uu link with one or more of remote UEs (e.g., UEs 602c, 602d, and/or 602e). Each of the Uu wireless communication links 606a and 606b may utilize a sub-6 GHz carrier frequency or a mmWave carrier frequency. In some examples, one or more UEs (e.g., UEs 602c, 602d, and 602d) may not have a Uu connection with the network entity 604.

In addition, respective D2D relay links 608a-608f (e.g., sidelinks) may be established between various UEs to enable relaying of information between the network entity 604 and one or more remote UEs, such as the UEs 602c-602e, or between a remote UE (e.g., the UE 602e) and a destination UE (e.g., the UE 602c). For example, the relay link 608a may be established between the UE 602c and the UE 602a, the relay link 608b may be established between the UE 602d and the UE 602a, the relay link 608c may be established between the UE 602e and the UE 602b, the relay link 608d may be established between the UE 602d and the UE 602b, the relay link 608e may be established between the UE 602c and the UE 602d, and the relay link 608f may be established between the UE 602d and the UE 602e. Each relay link 608a-608f may utilize, for example, decode and forward (DF) relaying, amplify and forward (AF) relaying, or compress and forward (CF) relaying. For DF relaying, HARQ feedback may be provided from the receiving device to the transmitting device. The sidelink communication over the relay links 608a-608d may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

The relay links 608a-608f may be established due to, for example, distance or signal blocking between the network entity 604 (or destination UE) and a remote UE (e.g., the UE 602e), weak receiving capability of the remote UE, low transmission power of the remote UE, limited battery capacity of the remote UE, and/or to improve link diversity. Thus, the relay links 608a-608f may enable communication between the network entity 604 and a remote UE (e.g., the UE 602e) to be relayed via one or more relay UEs (e.g., the UEs 602a-602d) over the Uu wireless communication links 606a and 606b and the relay links 608a-608f. In other examples, the relay links 608a-608f may enable sidelink communication to be relayed between a remote UE 602e and another destination UE (e.g., the UE 602c) over various relay links.

In some examples, the relay links 608a-608f may utilize a ProSe PC5 interface for sidelink communication between the UEs 602a-602e. To facilitate D2D sidelink communication between, for example, the UEs 602a and 602c over a sidelink (e.g., the relay link 608a), the UEs 602a and 602c may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink (e.g., the relay link 608a). For example, the discovery signal may be utilized by the UE 602c to measure the signal strength and channel status of a potential sidelink (e.g., the relay link 608a) with another UE (e.g., the UE 602a). The UE 602c may utilize the measurement results to select a UE (e.g., the UE 602a) for sidelink communication or relay communication.

In some examples, a common carrier may be shared between the relay links 608a-608f and the Uu wireless communication links 606a and 606b, such that resources on the common carrier may be allocated for both sidelink communication between the UEs 602a-602e and cellular communication (e.g., uplink and downlink communication)

between the UEs 602*a*-602*e* and the network entity 604. In addition, in a 5G NR sidelink deployment, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either preconfigured (e.g., a factory setting on the UE determined, for example, by sidelink standards or specifications) or configured by a base station (e.g., the network entity 604).

In addition, there may be two main resource allocation modes of operation for sidelink (e.g., PC5) communication. In a first mode, Mode 1, the network entity 604 (e.g., a gNB) may allocate resources to sidelink devices (e.g., the UEs 602*a*-602*e*) for sidelink communication between the UEs 602*a*-602*e* in various manners. For example, the network entity 604 may allocate sidelink resources dynamically (e.g., a dynamic grant) to the UEs 602*a*-602*e*, in response to requests for sidelink resources from the UEs 602*a*-602*e*. The network entity 604 may further activate preconfigured sidelink grants (e.g., configured grants) for sidelink communication among the UEs 602*a*-602*e*. In Mode 1, sidelink feedback (sidelink HARQ feedback) may be reported back to the network entity 604. For example, the UE 602*a* may transmit sidelink HARQ feedback received from the UE 602*c* to the network entity 604.

In a second mode, Mode 2, the UEs 602*a*-602*e* may autonomously select sidelink resources for sidelink communication therebetween. In some examples, a transmitting UE (e.g., the UE 602*a*) may perform resource/channel sensing to select resources (e.g., sub-channels) on the sidelink channel that are unoccupied. Signaling on the sidelink is the same between the two modes. Therefore, from a receiver's point of view, there is no difference between the modes.

A remote UE (e.g., the UE 602*d*) may generally connect to a source relay UE (e.g., the UE 602*a*) via a layer 3 (L3) connection with no Uu connection with (and no visibility to) the network or via a layer 2 (L2) connection where the remote UE supports Uu access stratum (AS) and non-AS (NAS) connections with the network. When there is no direct connection path (Uu connection) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF) as discussed below.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. SCI-1 may also include information about SCI-2. For example, SCI-1 may disclose the format of SCI-2. In some examples, the format may indicate the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for a NACK. SCI-2 may include other information that is useful for establishing and decoding a PSSCH resource.

Figure 7:
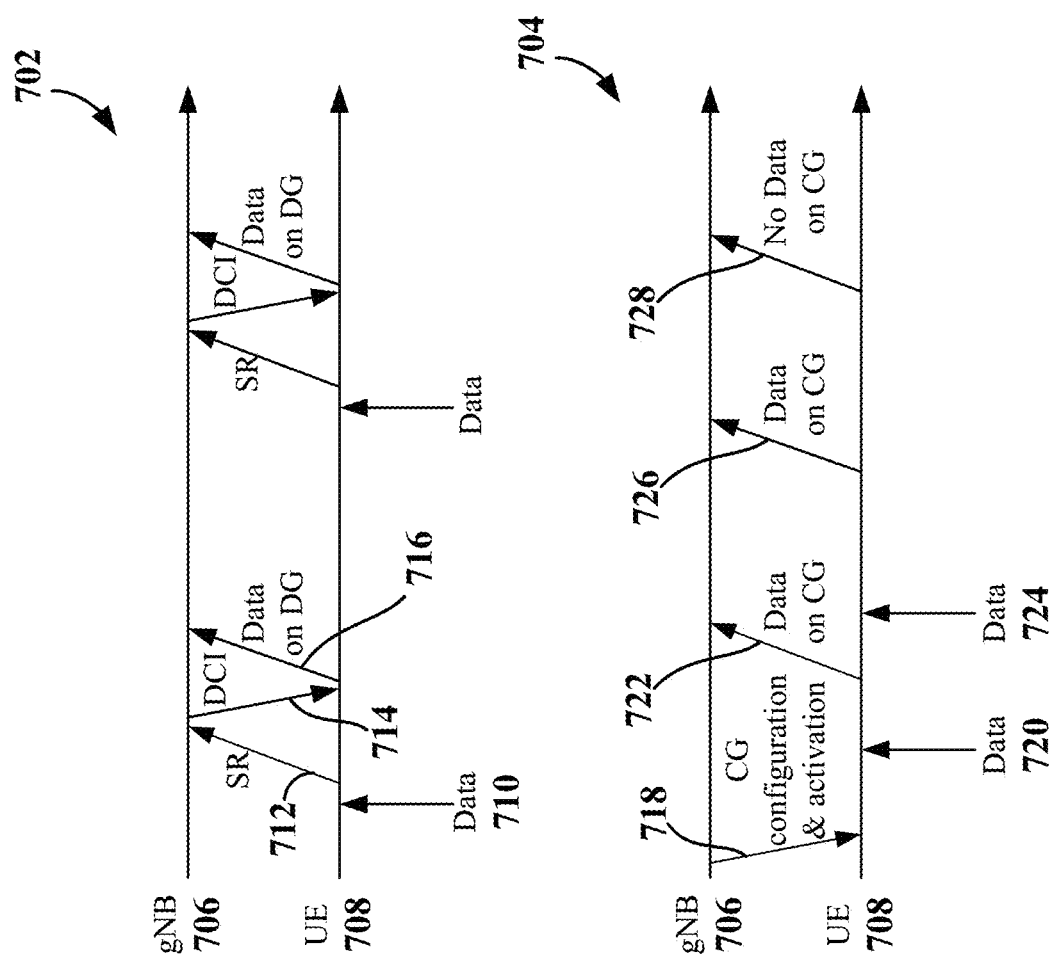
FIG. 7 is a signaling diagram illustrating an example of a dynamic grant and an example of a configured grant according to some aspects.

In some applications, the use of a dynamic grant or a configured grant might not provide an efficient use of resources. FIG. 7 illustrates examples of dynamic grant-related signaling 702 and configured grant-related signaling 704 between a gNB 706 and a UE 708.

For the dynamic grant-related signaling 702, when an application on the UE 708 has data 710 to be transmitted to the gNB 706, the UE 708 transmits a scheduling request (SR) 712 to the gNB 706. In response, the gNB 706 transmits a DCI 714 to the UE 708 scheduling resources (a dynamic grant (DG)) for a transmission by the UE 708. The UE 708 thus transmits the data 710 using the DG 716. As shown in the dynamic grant-related signaling 702 of FIG. 7, this process is repeated each time the UE 708 has data to transmit.

Thus, a dynamic grant (DC) is dynamically made available to a UE by explicit signaling from a gNB. While a dynamic grant may have more flexibility in terms of scheduling uplink transmissions, a dynamic grant may have relatively high signaling overhead associated with the scheduling request (SR) and the DCI. In addition, a dynamic grant may result in a higher latency than desired (e.g., due to the signaling overhead) for periodic deterministic loads.

For the configured grant-related signaling 704 of FIG. 7, the gNB 706 configures a set of resources (e.g., periodic resources) for the UE 708 to use, then transmits the corresponding configuration and activation instructions 718 to the UE 708. When an application on the UE 708 has data 720 to be transmitted to the gNB 706, the UE 708 waits for the next available configured grant (CG) 722 and transmits the data on that CG. This process is repeated as long as the UE 708 has data to transmit to the gNB 706. For example, the UE 708 transmits data 724 on the CG 726. However, the UE 706 does not have data to transmit on the CG 728.

Thus, a configured grant (Type 1 and Type 2) is a semi-static periodic grant that becomes available to a UE once activated until deactivation. A configured grant (CG) may provide a more suitable (e.g., lower) latency for periodic deterministic loads than a dynamic grant. However, a configured grant wastes resource if the traffic is sporadic (the traffic is periodic but occurs only 1% of the periods).

Moreover, a dynamic grant or a configured grant might not provide sufficiently robust resource allocation in scenarios where an application should receive data on time to prevent an error condition. For example, in some industrial use cases, a constraint on survival time (e.g., how long an application can survive without a packet) is specified for the system. This introduces some challenges when a transmission fails (for example an LBT failure) for at least the following reasons.

The survival time constraint can be very tight, not giving enough time for the gNB to reschedule a retransmission. The UE may not have any grants to retransmit in this case which causes survival time expiry.

Autonomous packet data convergence protocol (PDCP) duplication has been discussed in the context of increasing reliability of a retransmission. However, autonomous PDCP duplication is only useful if a grant becomes available on the SCG resources. There are no guarantees for that unless a grant has been proactively allocated to the UE (which would be very wasteful of resources) or a grant exists that can be pre-empted which is not guaranteed, making the solution either overtly wasteful or non-robust.

In case of LBT failures, it may be challenging for the gNB to schedule a retransmission (re-tx) since in NR-U (and possibly an unlicensed controlled environment UCE)), the HARQ ID assigned to the transmission by the UE is unknown to the gNB.

Also, it is desirable to minimize control signaling (e.g., scheduling retransmissions) since that increases capacity by freeing up resources, and also increases reliability by making the system more robust to channel failures.

Furthermore, there are some other use-cases explained below where a configured grant is not applicable or useful (e.g., for retransmissions) and a dynamic grant would violate the latency constraints of the traffic (e.g., for URLLC).

Figure 8:
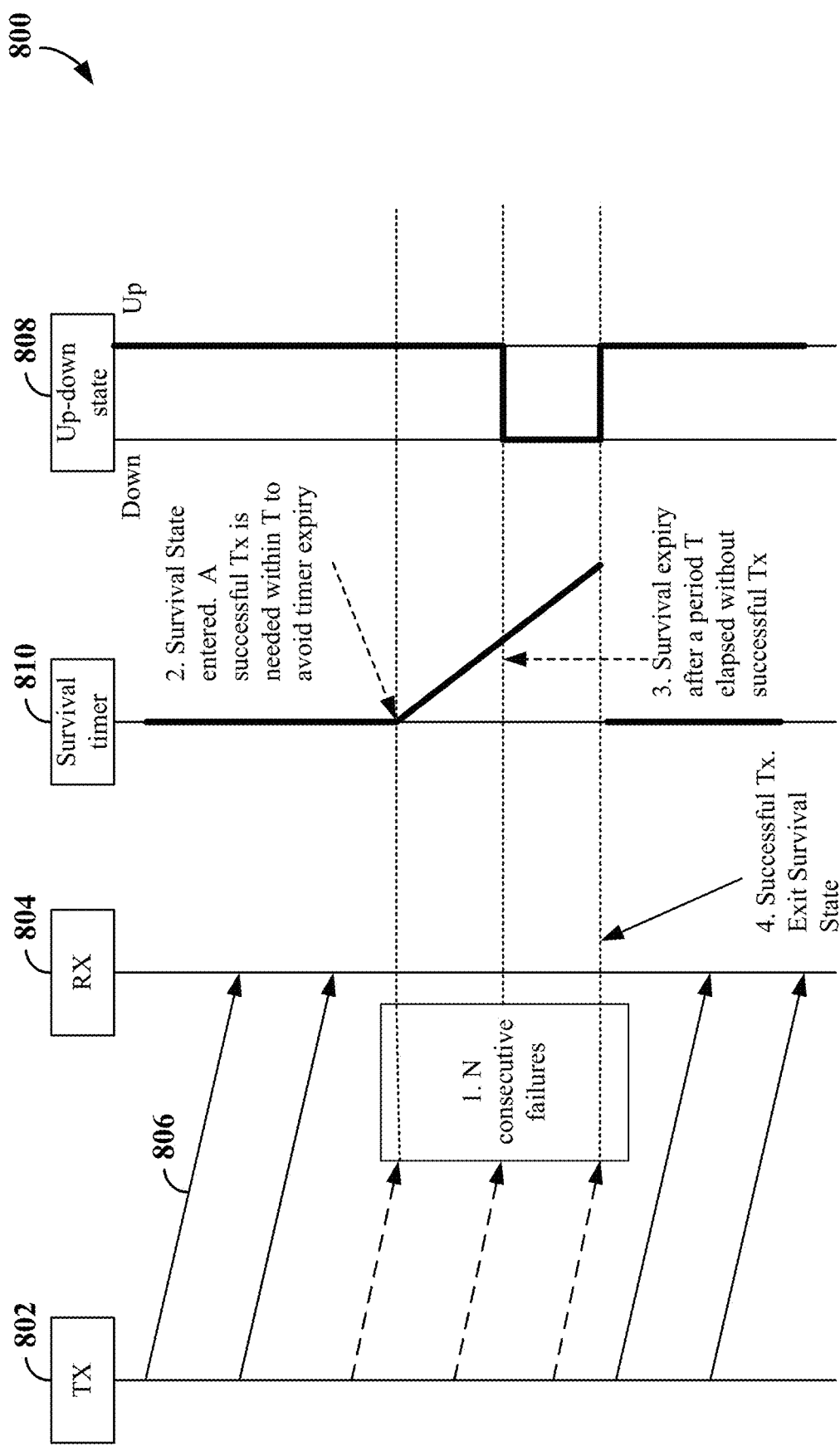
FIG. 8 is a diagram illustrating an example of a survival time for a system according to some aspects.

For some types of systems (e.g., cyberphysical systems), individual packet failures can be tolerated to some extent. However, consecutive failures that leave an application without a successful message for a period of time that exceeds a survival time may cause the system to go into a "DOWN" state, which may be very costly to manufacturing systems and the like. FIG. 8 illustrates an example 800 of a survival time failure in a system where a transmitter device (Tx) 802 transmits to a receiver device (Rx) 804 and where the system that has certain receive data requirements. Initially, the transmissions (e.g., a transmission 806) from the transmitter device 802 are successfully received by the receiver device 804. Accordingly, the system is in an UP state as indicated by the UP-DOWN state 808. At 1 of FIG. 8, however, the transmissions from the transmitter device 802 fail to successfully reach the receiver device 804. Thus, at 2, the system enters a survival state, whereby the system will subsequently enter a DOWN state if it does not successfully receive a transmission prior to the expiry of a survival timer 810 at the receiver device (RX) 804. As indicated in FIG. 8, the transmissions fail N consecutive times, thereby resulting in the expiration of the survival timer 810. As a result of the expiration of the survival timer 810, at 3, the operating state of the system switches from the UP state to the DOWN state (e.g., due to the failure to receive critical data). At some later point in time as represented by 4, the operating state of the system may switch from the DOWN state to the UP state upon successfully receiving a transmission from the transmitter device 802.

Survival time may be defined as the time that an application consuming a communication service may continue without an anticipated message. From a RAN standpoint, survival time may refer to a time period during which message loss can be tolerated. Tables 1 and 2 illustrate example survival times for different types of communication services. Note that Tables 1 and 2 represent a single table that has been split into two tables to fit on a page.

TABLE 1

Characteristic Parameter

| Communication service availability: target value | Communication service reliability: mean time between failures | End-to-end latency: maximum | Service bit rate: user experienced data rate | Remarks |
| --- | --- | --- | --- | --- |
| 99.999% to 99.999 999% | ~10 years | < transfer interval value | ~ | Motion control (A 2.2.1) |
| 99.999 9% to 99.999 999% | ~10 years | < transfer interval value | ~ | Motion control (A 2.2.1) |
| 99.999 9% to 99.999 999% | ~10 years | < transfer interval value | ~ | Motion control (A 2.2.1) |
| 99.999 9% | ~ | <5 ms | 1 kbit/s (steady state) 1.5 Mbit/s (fault case) | Electrical Distribution ~ Distributed automated switching for isolation and service restoration (A 4.4); |
| 99.999 9% to 99.999 999% | ~10 years | < transfer interval value | ~ | Control-to-control in motion control (A 2.2.2); |
| 99.999 9% to 99.999 999% | ~10 years | < transfer interval value ( | 50 Mbit/s | Wired-2-wireless 100 Mbit/s link replacement (A 2.2.4) |
| 99.999 9% to 99.999 999% | ~10 years | < transfer interval value | 250 Mbit/s | Wired-2-wireless 1 Gbit/s link replacement (A 2.2.4) |
| 99.999 9% | ~10 years | < transfer interval value | ~ | Mobile robots (A 2.2.3) |
| 99.999 9% to 99.999 999% | ~1 month | < transfer interval value | ~ | Mobile control panels remote control of e.g. |

TABLE 1-continued

| Characteristic Parameter | | | | |
|---|---|---|---|---|
| Communication service availability: target value | Communication service reliability: mean time between failures | End-to-end latency: maximum | Service bit rate: user experienced data rate | Remarks |
| 99.999 999% | 1 day | 10 ms to 100 ms | 10 kbit/s | assembly robots, milling machines (A 2.4.1); (note 9) Mobile Operation Panel: Control to visualization (A 2.4.1A) |
| 99.999 999% | 1 day | <1 ms (note 14) | 12 Mbit's to 16 Mbits | Mobile Operation Panel: Motion control (A 2.4. 1A) |
| 99.999 999% | 1 day | <2 ms (note 14) | 16 kbit/s (UL) 2 Mbit/s (DL) | Mobile Operation Panel: Haptic feedback data stream (A 2.4.1A) |
| 99.999 9% to 99.999 999% | ~1 year | < transfer interval | ~ | Mobile control panels - remote control of e.g. mobile cranes, mobile pumps, fixed portal cranes (A 2.4.1); |

TABLE 2

| Communication service availability: target value | Influence quantity | | | | | |
|---|---|---|---|---|---|---|
| | Message size (byte) | Transfer interval: target value | Survival time | UE speed | # of UEs | Service area |
| 99.999% to 99.999999% | 50 | 500 us | 500 us | ≤75 km/h | ≤20 | 50 m × 10 m × 10 m |
| 99.9999% to 99.999999% | 40 | 1 ms | 1 ms | ≤75 km/h | ≤50 | 50 m × 10 m × 10 m |
| 99.9999% to 99.999999% | 20 | 2 ms | 2 ms | ≤75 km/h | ≤100 | 50 m × 10 m × 10 m |
| 99.9999% | <1,500 | <60 s (steady state) ≥1 ms (fault case) | Transfer interval | stationary | 20 | 30 km × 20 km |
| 99.9999% to 99.999999% | 1K | ≤10 ms | 10 ms | — | 5 to 10 | 100 m × 30 m × 10 m |
| 99.9999% to 99.999999% | | ≤1 ms | 3x transfer interval | stationary | 2 to 5 | 100 m × 30 m × 10 m |
| 99.9999% to 99.999999% | | ≤1 ms | 3x transfer interval | stationary | 2 to 5 | 100 m × 30 m × 10 m |
| 99.9999% | 40 to 250 | 1 ms to 50 ms | Transfer interval value | ≤50 km/h | ≤100 | ≤1 km² |
| 99.9999% to 99.999999% | 40 to 250 | 4 ms to 8 ms | Transfer interval value | <8 km/h (linear movement) | TBD | 50 m × 10 m × 4 m |
| 99.999999% | 10 to 100 | 10 ms to 100 ms | Transfer interval | stationary | 2 or more | 100 m² to 2,000 m² |
| 99.999999% | 10 to 100 | 1 ms | ~1 ms | stationary | 2 or more | 100 m² |
| 99.999999% | 50 | 2 ms | ~2 ms | stationary | 2 or more | 100 m² |
| 99.9999% to 99.999999% | 40 to 250 | <12 ms | 12 ms | <8 km/h (linear movement) | TBD | Typically 40 m × 60 m; maximum 200 m × 300 m |

As indicated in Tables 1 and 2, survival time requirements can be very stringent (e.g., as low as 0.5 ms). The disclosure relates in some aspects to improving reliability associated with a survival state to avoid survival timer expiry and entrance to a DOWN state. In practice, a gNB implementation (e.g., by activating PDCP duplication) might not be sufficient to boost reliability. For example, a gNB may need a few milliseconds to react to a failure, which may be too slow for many use cases.

Figure 9:
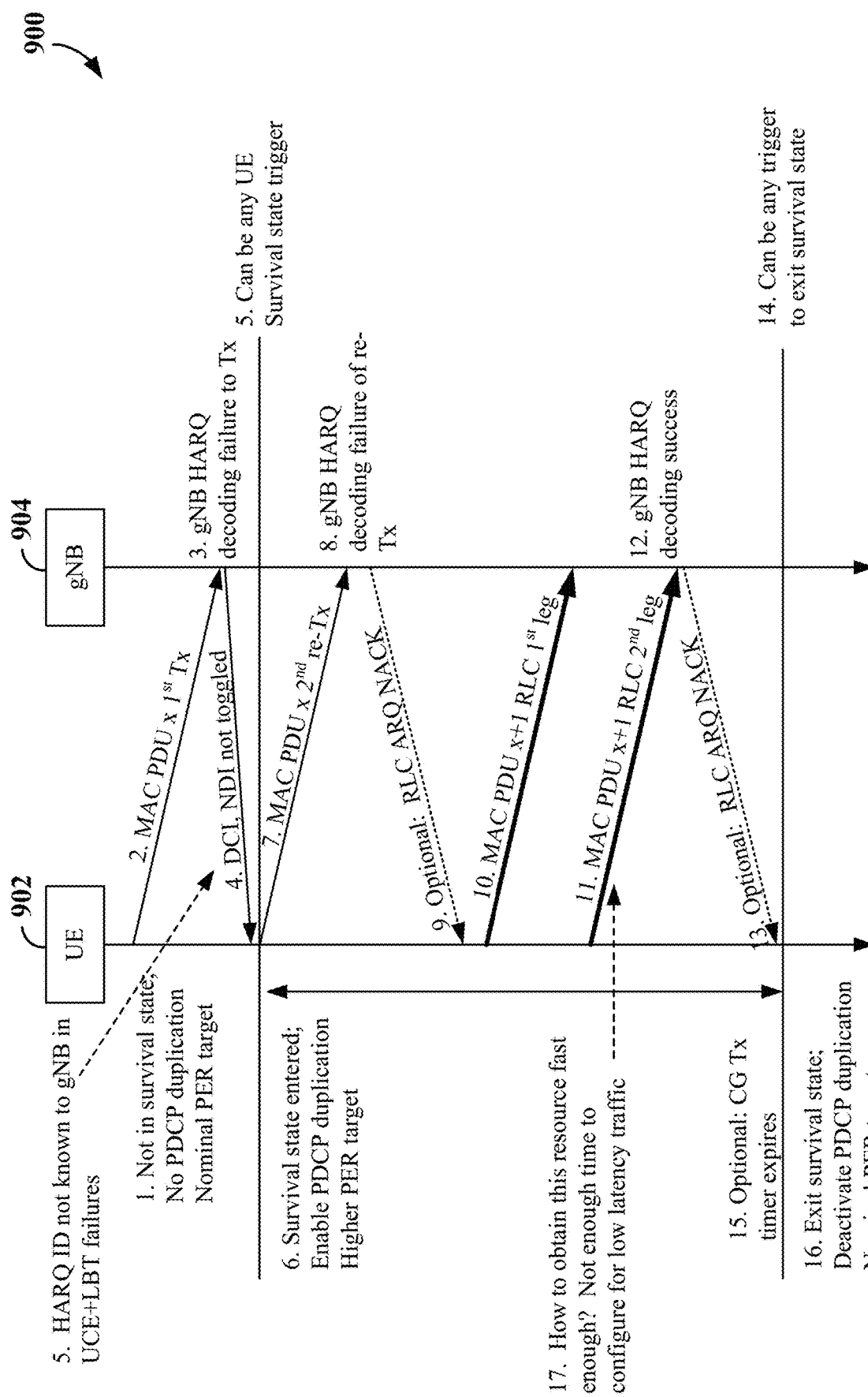
FIG. 9 is a signaling diagram illustrating an example of packet data convergence protocol (PDCP) duplication according to some aspects.

A UE could quickly activate PDCP duplication (and not wait for a MAC CE) to boost reliability. FIG. 9 illustrates an example of such a PDCP duplication approach in a system that includes a UE 902 and a gNB 904. At 1 of FIG. 9, initially, the system is not in a survival state and PDCP duplication is not used at this point. At 2, the UE 902 transmits a protocol data unit (PDU) to the gNB 904. At 3, the gNB 904 fails to decode the MAC PDU from the UE 902. At 4, the gNB sends a DCI to the UE 902 where the new data indicator (NDI) in the DCI is not set. As indicated by 5, if the failure was due to an LBT failure in UCE, the HARQ-ID that the UE 902 may elect to use for a retransmission would not be known to the gNB 904. This issue is addressed in more detail below. At 5, survival state is triggered (e.g., due to a failure to receive critical data or some other trigger) and the system enters the survival state at 6. At 7, the UE 902 sends a retransmission. However, the gNB 904 fails to decode the retransmission at 8. At 9, the gNB 904 may transmit feedback (e.g. a NACK) to the UE 902. The UE 902 and the gNB 904 then commence PDCP duplication, where the UE 902 transmits a MAC PDU and the radio link control (RLC) information on a scheduled first leg (e.g., on a different cell) at 10 and, if needed, on a second leg at 11. In this example, the gNB 904 successfully decodes the PDU at 12 and optionally sends feedback (e.g., an ACK) at 13. Thus, at 14, an exit from survival state is triggered (e.g., due to successful reception of critical data or some other trigger), a transmission timer may expire at 15, and the system exits the survival state at 16. As indicated by 17, one issue that arises in this scenario is whether the UE 902 can be scheduled with the resources for the second log fast enough. This issue may be particularly critical for low latency traffic.

For example, a problem with the approach of FIG. 9 is that a resource to be used for a secondary node (SN) in a dual connectivity mode of operation or a component carrier (e.g., CC2) in a carrier aggregation mode of operation to perform duplication (e.g., to improve reliability) may not be available. Possible solutions to this problem tend to be either very wasteful (e.g., proactive allocation) or non-robust (e.g., prioritize critical packets over other possible eMBB packets), but still provide no guarantee that other grants are available.

Figure 10:
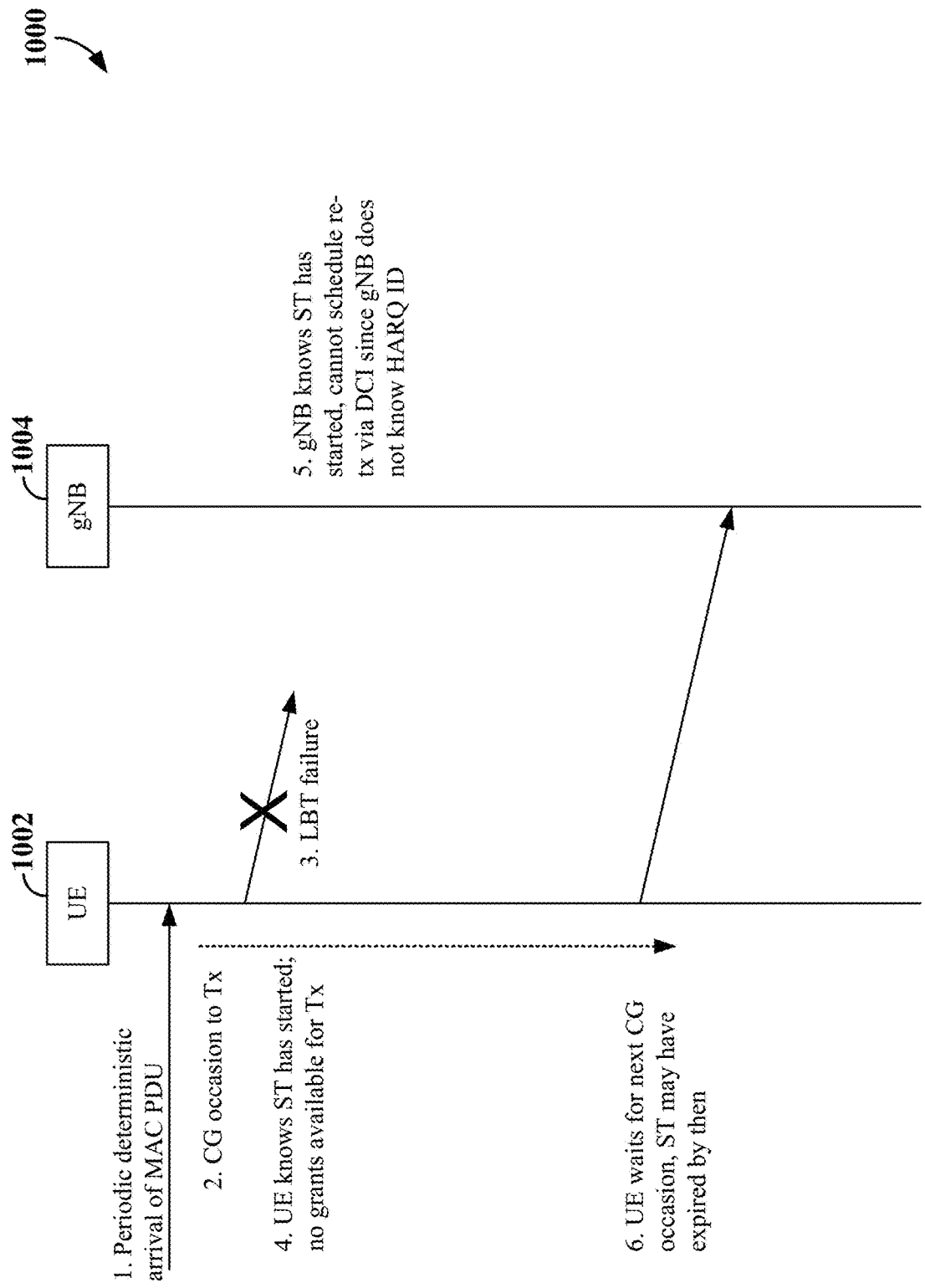
FIG. 10 is a signaling diagram illustrating an example of a listen before talk (LBT) failure according to some aspects.

Moreover, in an unlicensed controlled environment (UCE) for NR-U, a gNB may not know the HARQ ID of the MAC PDU information. FIG. 10 illustrates an example of this scenario in a scenario where a UE 1002 has data to send to a gNB 1004. At 1 of FIG. 10, the system is configured for periodic deterministic arrival of a MAC PDU at the gNB 1004 using configured grants. A CG occasion occurs at 2 and the UE attempts to access to the unlicensed band. However, at 3, the UE 1002 experiences an LBT failure when attempting to gain access to the unlicensed band for the transmission to the gNB 1004. At 4, the UE knows the scheduled transmission time has started but does not have a grant to transmit the PDU. Similarly, at 5, the gNB knows the scheduled transmission time has started, but cannot reschedule a retransmission. Since HARQ ID selection is left to UE implementation, the gNB does not know the HARQ ID without receiving the CG-UCI from the UE 1002. Thus, there is no straightforward method for the gNB to schedule a DG for retransmission fast-enough. Thus, at 6, the UE must wait for the next CG occasion to transmit the PDU.

The disclosure relates in some aspects to a configured grant where each instance is activated if a pre-configured condition is TRUE. In some aspects, such a conditional configured grant may combine the availability of a configured grant and the dynamicity of a dynamic grant, while minimizing the control overhead. A conditional configured grant may be used in a variety of modes of operation including, as non-limiting examples, a standalone (SA) mode of operation, a dual connectivity (DC) mode of operation, a multi-connectivity (MC) mode of operation, a carrier aggregation mode of operation, or a PDCP duplication mode of operation.

Figure 11:
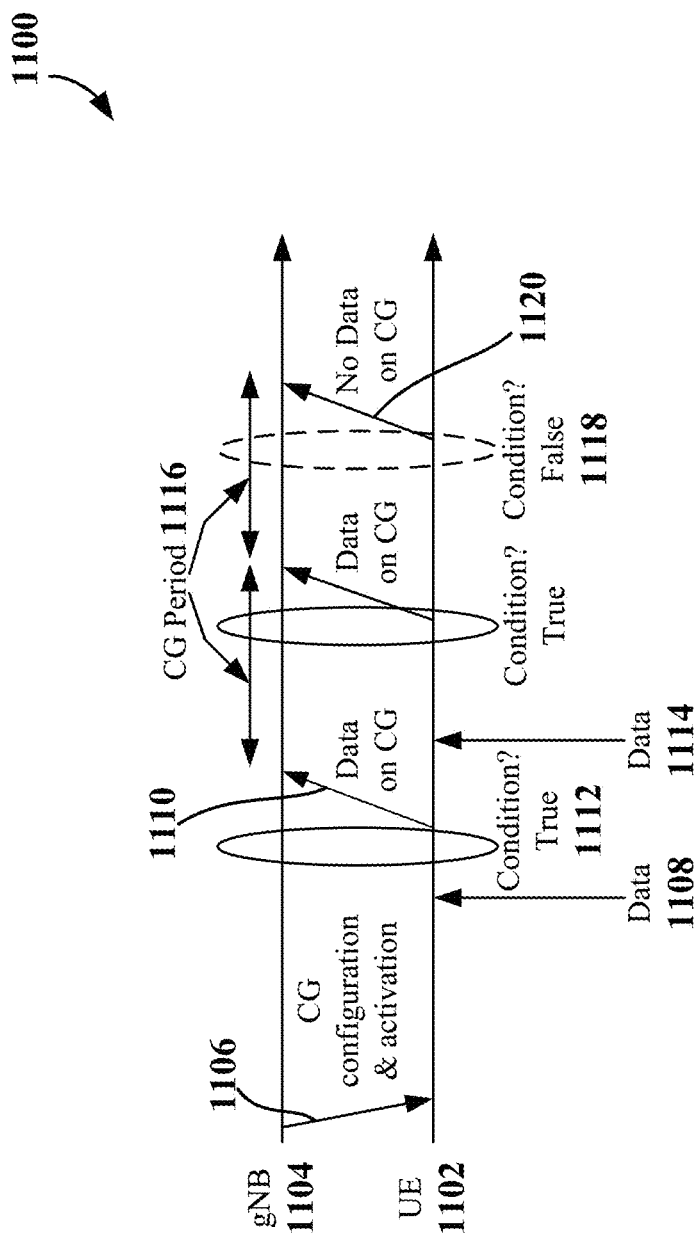
FIG. 11 is a signaling diagram illustrating an example of a conditional configured grant according to some aspects.
Figure 12:
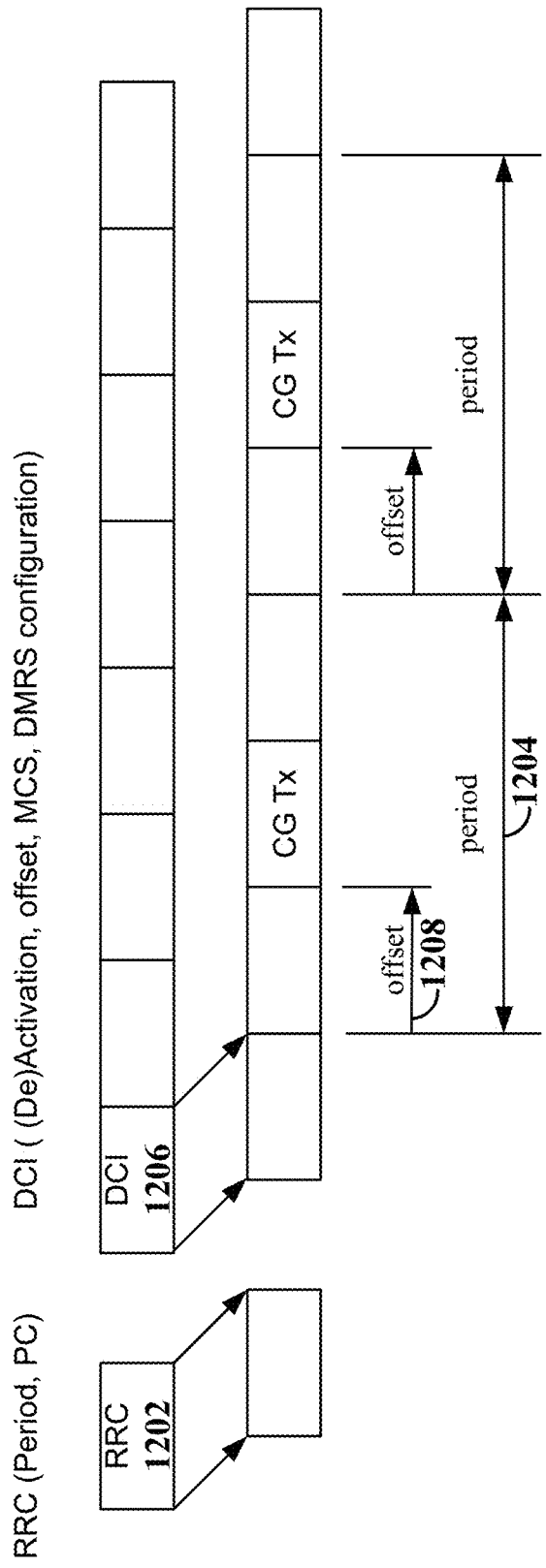
FIG. 12 is a diagram illustrating an example of activating a configured grant according to some aspects.

An example of such a conditional configured grant is shown in FIG. 11. Here, a UE 1102 is allowed to transmit on an instance of the configured grant only if the condition is true. Likewise, a gNB 1104 may monitor for the transmission by the UE on this instance of the configured grant only if the condition is true. In other words, the occasion is only available if a condition (e.g., RRC-configured) is TRUE at the occasion. If the condition is FALSE, the CG occasion is unavailable, and the UE will not attempt a transmission. Exact conditioning can work for type 1 CG as well.

In FIG. 11, the gNB 1004 configures a set of resources (e.g., periodic resources) for the UE 1102 to use, then transmits the corresponding configuration and condition 1106 to the UE 1102. When an application on the UE 1102 has data 1108 to be transmitted to the gNB 1104, the UE 1102 waits for the next available configured grant (CG) 1110 and determines whether the applicable condition is true 1112. If the condition is true, the UE 1102 transmits the data on that CG. This process is repeated as long as the UE 1102 has data to transmit to the gNB 1104. For example, if the condition is true, the UE 1102 transmits data 1114 on the CG in the next CG period 1116. However, if the condition is false 1118 for a CG 1120, the UE 1102 does not transmit on that CG.

As discussed above and shown in the diagram 1202 of FIG. 12, a conventional configurated grant is a semi-static opportunity for UL Tx that is "always" there unless otherwise deactivated by DCI. An RRC message 1202 configures the period 1204 and power control (PC) for the CG. In a Type 2 CG, the RRC message 1202 configures the CG, while activation is performed by a DCI 1206. For example, the DCI 1206 may carry an indication of whether a CG is activated/deactivated/reactivated, an offset 1208, an MCS value, a DMRS configuration, and so on.

Figure 13:
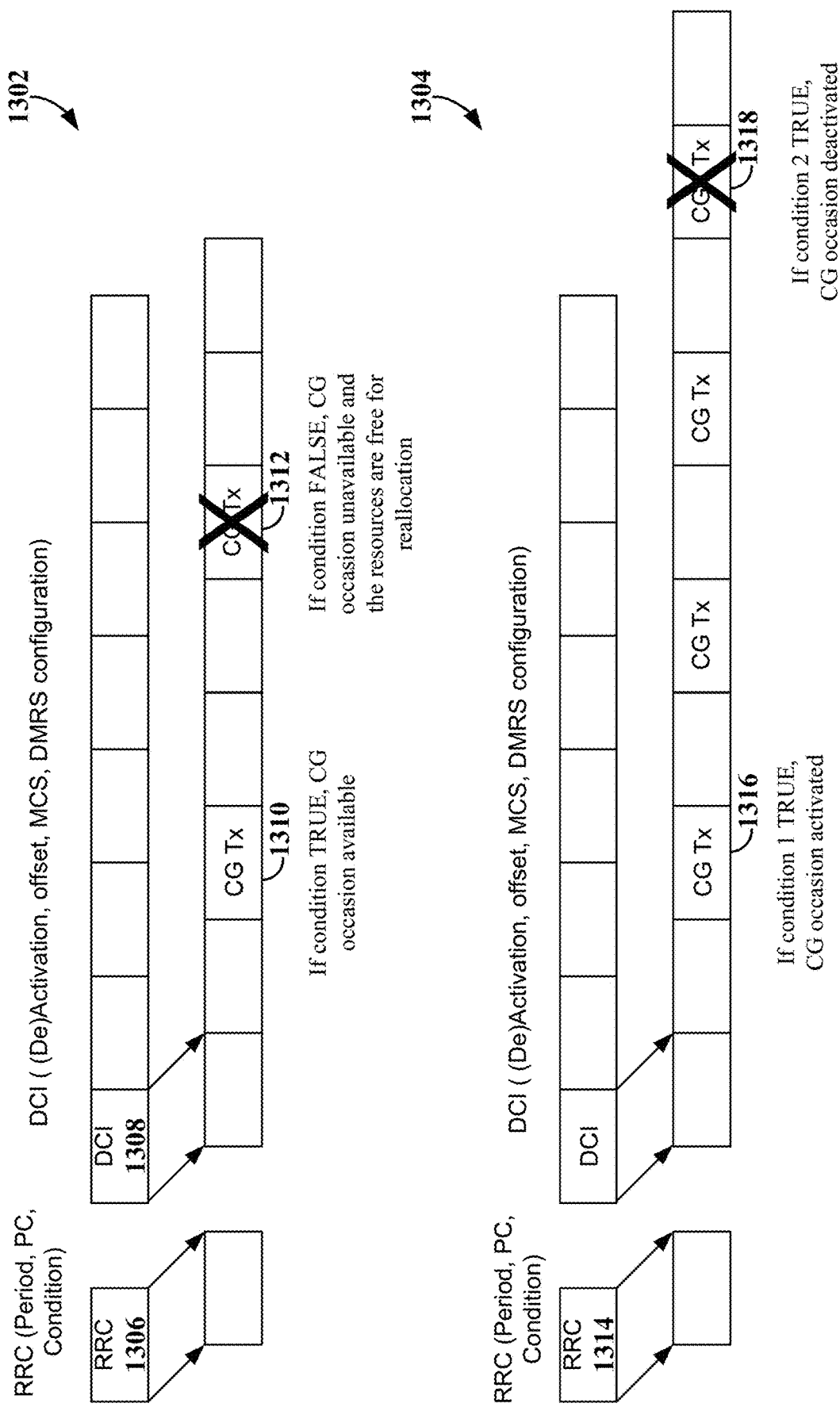
FIG. 13 is a diagram illustrating examples of activating and deactivating a conditional configured grant according to some aspects.

FIG. 13 illustrates two examples 1302 and 1304 of activation and deactivation for a condition configured grant. In some aspects, a conditional configured grant may operate as a normal configured grant by being configured and activated/deactivated by an RRC message 1306 in the case of a Type 1 grant and activated/deactivated by a DCI 1308 in the case of a Type 2 grant as shown in the example 1302 of FIG. 13. However, this periodic grant is only available if an RRC preconfigured condition (e.g., a condition parameter carried by the DCI 1308) is TRUE 1310. Thus, if the RRC preconfigured condition is FALSE 1312, the CG occasion is not available for use by this UE. In this case, the gNB is free to reallocate these resources for some other use.

As shown in the example 1304 of FIG. 13, conditional activation and deactivation may be used to activate and deactivate conditional CG resources. For example, the RRC message 1314 may carry an indication of a first condition (condition 1) for activation of one or more CG occasions and an indication of a second condition (condition 2) for deactivation of one or more CG occasions. In some examples, a CG is activated (e.g., active on all future resources until deactivation) if a certain condition (condition 1) is TRUE 1316. In some examples, a CG is deactivated (e.g., inactive on all future resources until (re)activation) if a certain condition (condition 2) is TRUE 1318.

For the survival time use-case, the RRC condition can be: "failure of original CG." The conditional CG can be configured as a back-up in case the original transmission fails. This solves the two problems for the survival use-case discussed above.

The conditional CG can be overbooked acting as a backup for multiple UEs relying on the fact that failures are independent and rare. This mitigates the need for wasteful proactive allocation.

The conditional CG may be especially beneficial for the cases of LBT failures. Since the gNB does not know the HARQ ID the UE implementation has chosen, it may be challenging for the gNB to dynamically schedule a retransmission for an LBT failure. The conditional CG solves this problem by not being tied to a HARQ ID.

Figure 14:
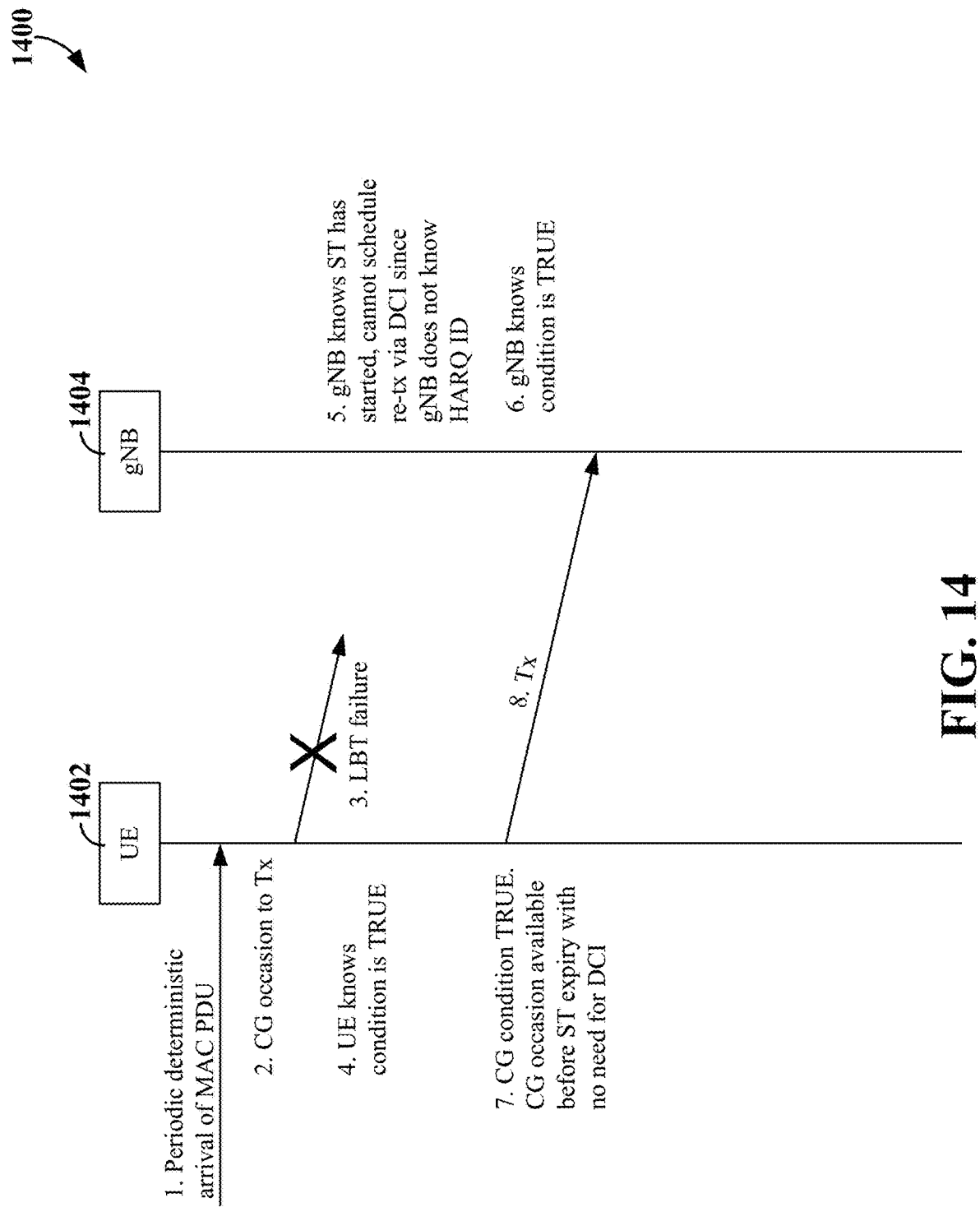
FIG. 14 is a signaling diagram illustrating an example of a listen before talk (LBT) failure on a conditional configured grant resource according to some aspects.

FIG. 14 illustrates an example 1400 of using a conditional CG for a survival time use case in a scenario where a UE 1402 has data to send to a gNB 1404. At 1 of FIG. 14, the system is configured for periodic deterministic arrival of a MAC PDU at the gNB 1004 using conditional configured grants. A CG occasion occurs at 2 and the UE attempts to access to the unlicensed band. A UE LBT failure occurs when transmitting deterministic periodic traffic at 3. The UE knows of the LBT failure. Thus, the condition (LBT failure) is true at 4. At 5, the gNB knows the scheduled transmission time has started, but cannot reschedule a retransmission. The gNB knows a periodic deterministic transmission failed (due to LBT failure likely). Thus, the condition (LBT failure) is true at 7. Thus, both the UE and the gNB know the condition (LBT failure) is TRUE.

A conditional CG can be configured for a retransmission at 7 and 8, possibly, multiple conditional CG occasions to cover autonomous PDCP duplication. This solves the question of where the resources for UE autonomous duplication come from as discussed above. This also solves the issue that the gNB does not need to schedule a retransmission on a DG for the HARQ process that is only known by UE as discussed above.

As mentioned above, a conditional CG can be used to overbook a single retransmission occasion. The same CG occasion can be allocated to different UEs; if the condition is a rare event (e.g. 10^-5) and this unlikely condition is true for more than one 1 UE, then there is a rare chance of condition collision (e.g., two UEs each have a true condition). A gNB cancellation is still available for collision. A CG occasion can be used for other transmissions and canceled by the gNB whenever a rare condition is true for some UEs. Thus, this approach may be useful for a survival time use case for high capacity (e.g., where there is no need to overbook since failure does not happen 99.9999% of the time).

The condition of the conditional CG can be tied to a reference signal received power (RSRP) as shown in diagrams 1502 and 1504 of FIG. 15. This enables the implementation of opportunistic transmission without any control signaling by making the condition based on measure radio conditions known to UE and gNB. For example, the condition for conditional configured grant can be tied to measured UL/DL signal strength 1506.

In some examples, a gNB can configure the condition to be FALSE if the measured signal strength is low 1508 (e.g., RSRP<low_threshold) as shown in the diagram 1502. For example, if the RSRP is low due to blockage or fast fading the corresponding CG 1510 will likely fail. Thus, there is no need to transmit and the conditional CG not activated.

In some examples, a gNB can configure the condition to be TRUE if the measured signal strength is high 1512 (e.g., RSRP>high_threshold) as shown in the diagram 1504. For example, a conditional CG with a high MCS can be scheduled to opportunistically transmit at a high rate when the channel is good. Thus, the conditional CG may be activated in this case.

Multiple thresholds for conditional configured grant scheme can be simultaneously configured in some examples. The diagrams 1602 and 1604 of FIG. 16 illustrate a two-RSRP threshold example. As in the example of FIG. 15, the condition for a conditional configured grant can be tied to measured UL/DL signal strength 1606.

The first conditional CG 1608 has a high MCS reflecting "optimism." For example, if the channel is good 1614 as shown in the diagram 1604, a high MCS resource may be used to improve throughput. The second conditional CG 1610 has a low MCS to act as an automatic fallback to a more reliable resource. For example, if the channel is bad 1612 for the first conditional CG 1608 as shown in the diagram 1602, then the second conditional CG 1610 will provide higher reliability. Configuring this setup with conditional CGs does not require any DCI signaling. The gNB is free to reallocate the resource that is not going to be used. Configuring tandem conditional grants this way allows for URLLC traffic to balance throughput and reliability without relying on complicated L2 signaling that can violate a PDB.

Figure 17:
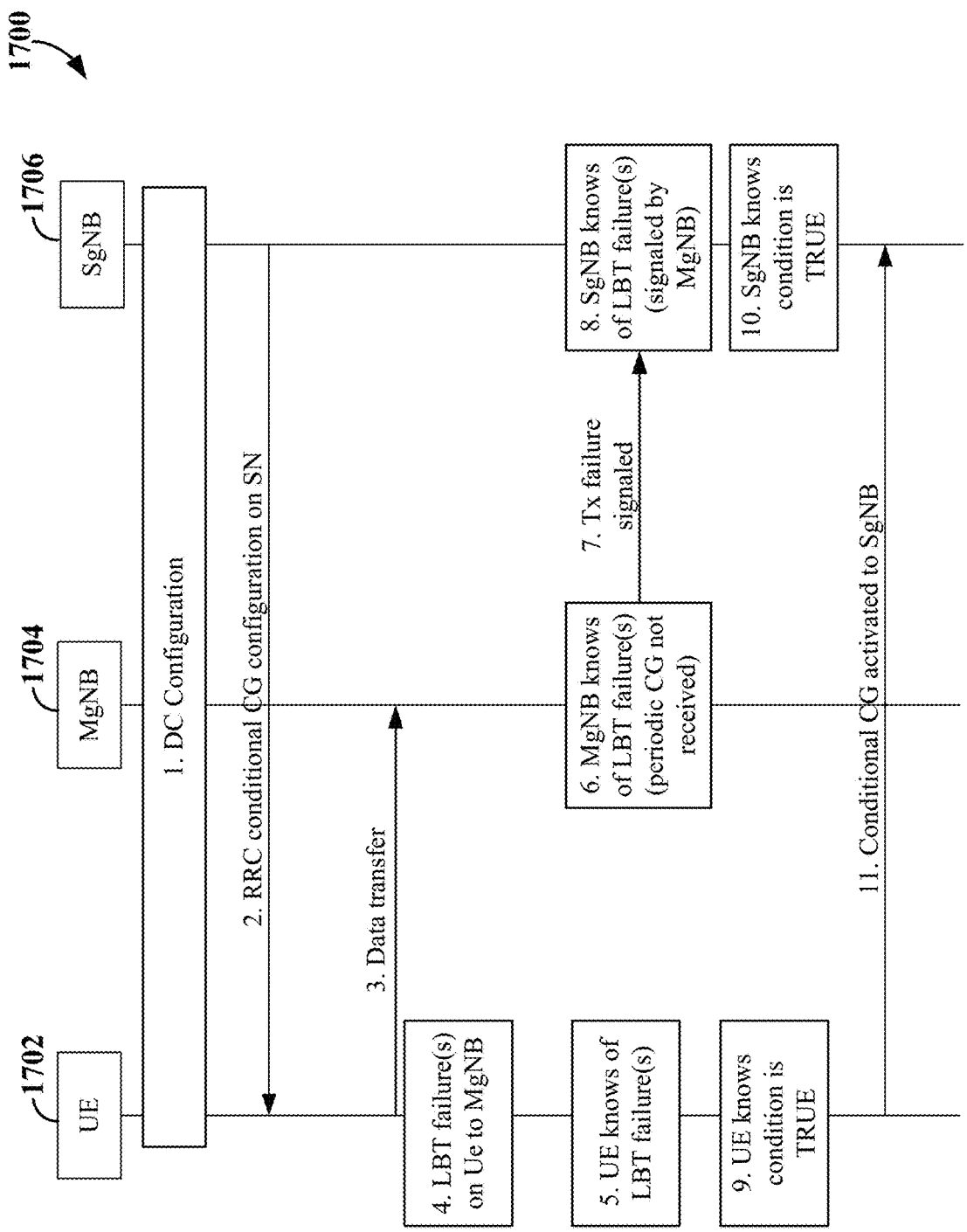
FIG. 17 is a signaling diagram illustrating an example of conditional inter-cell communication according to some aspects.

A conditional CG can be configured on a cell with the condition tied to another cell as shown in the system 1700 of FIG. 17. The system 1700 include a UE 1702, a master gNB 1704 (e.g., a cell of a master cell group (MCG)) and a secondary gNB 1706 (e.g., a cell of a secondary cell group (SCG)). In the case of autonomous PDCP duplication to increase reliability, a conditional configured grant can be activated on SCG upon failure of a first transmission on a MCG. The retransmission attempt can then be duplicated and sent on the MCG via a DG and SCG via the automatic activation of conditional CG.

As mentioned earlier, autonomous activation of PDCP duplication for the UE can help with satisfying URLLC traffic with survival time constraints. This idea can be generalized to any carrier aggregation/dual connectivity use case. For example, if the primary connection with an MgNB fails due to LBT failure(s) for example, the conditional CG can be activated to SgNB with or without duplication. The SgNB knows the condition is TRUE from MgNB signaling. The MgNB knows the condition is TRUE since a deterministic periodic MAC PDU has not been received. For example, in FIG. 17, dual connectivity (DC) is configured at 1, followed by RRC configuration of the conditional CG on the secondary node (SN) (SgNB 1706) at 3. A data transfer is scheduled at 3, but fails due to an LBT failure at 4. At 5, the UE 1702 knows of the LBT failure. In addition, the MgNB 1704 learns of the LBT failure at 6 since it failed to receive the expected transmission. At 7, the MgNB 1704 signals an indication of the failure to the SgNB 1706. Thus, the SgNB 1706 learns of the LBT failure at 8. Accordingly, the UE 1702 knows the condition (LBT failure) is true at 9 and the SgNB knows the condition (LBT failure) is true at 10. Accordingly, the UE 1702 may transmit the data to the SgNB 1706 on a conditional CG. If needed, the SgNB 1706 may forward the data to the MgNB 1704 (not shown in FIG. 17). This scheme offers a very small reaction time since no explicit signaling is needed. This scheme also circumvents the difficulty of scheduling a retransmission from the gNB when the HARQ ID is not known by the gNB as discussed above.

Figure 18:
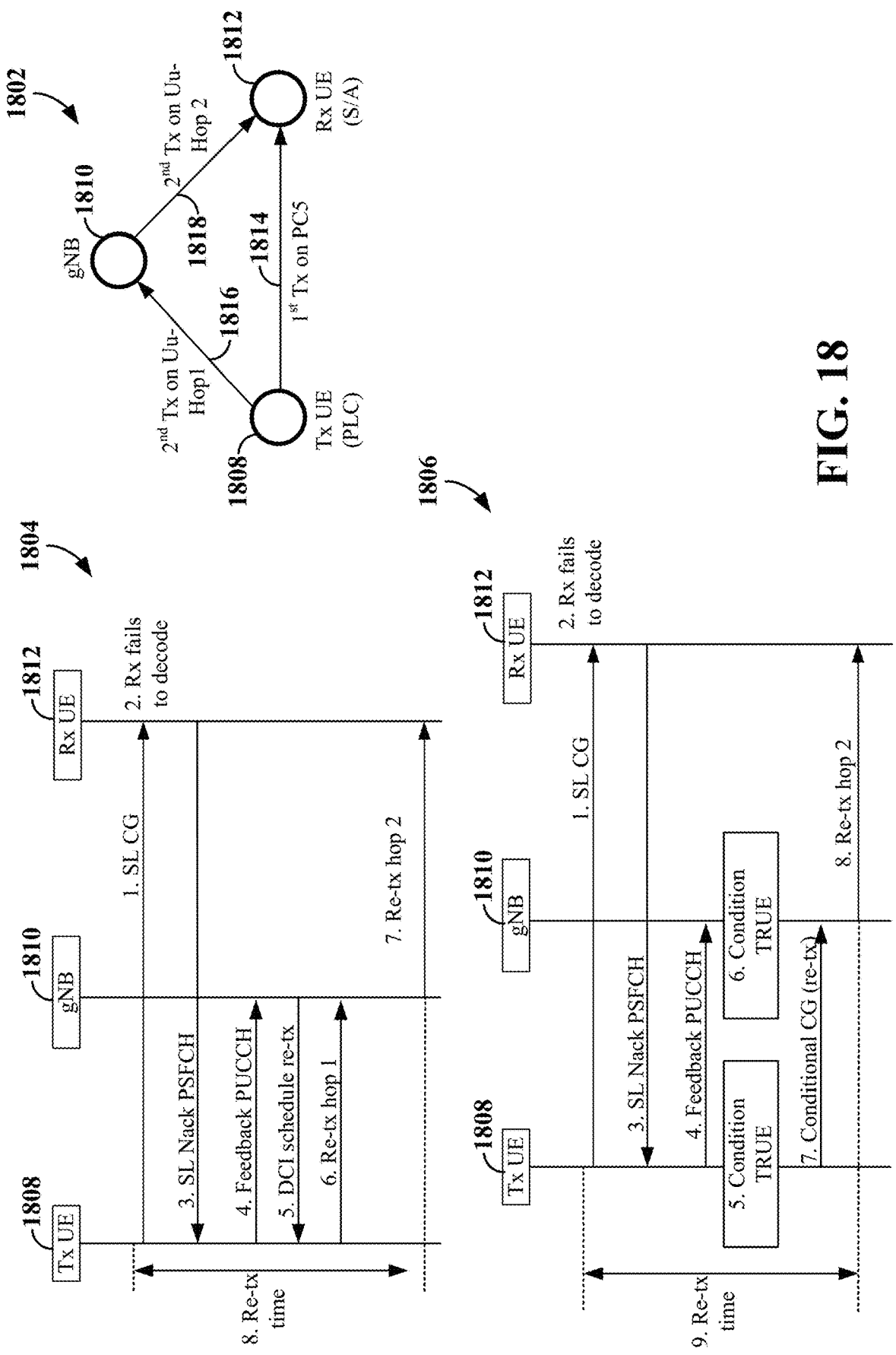
FIG. 18 is a signaling diagram illustrating an example of conditional communication for a sidelink application according to some aspects.

The conditional CG can also be configured for a sidelink grant (SL CG) or an SPS DL configuration as shown in the diagrams 1802, 1804 and 1806 of FIG. 18. As shown in the diagram 1802, a first UE 1808 may need to transmit data to a second UE 1812 via a sidelink 1814. In the event this transmission fails, the first UE 1808 may transmit the data to a gNB 1810 via a first Uu hop 1816, whereby the gNB 1810 forwards the data to the second UE 1812 via a second Uu hop 1818.

For example, in a factory setting, there may be deterministic periodic communication between a programmable logic controller UE (PLC-UE) and a sensor/actuator UE (S/A-UE). In sidelink Mode A, the gNB has full control of all PC5 and Uu connections as discussed above. It has been proposed that the first transmission can happen over the PC5 SL connection. If the first transmission fails, a retransmission can occur over the two-hop Uu path from the PLC-UE to the gNB to the S/A-UE for increased reliability. For example, in diagram 1804 of FIG. 18, the first UE 1808 attempts a sidelink transmission on a CG at 1. At 2, the second UE 1812 fails to receive the transmission, so the second UE 1812 sends feedback (e.g., a NACK) at 3. At 4, the first UE 1808 forwards the feedback to the gNB 1810. The gNB 1810 sends a DCI to the first UE 1808 at 5, scheduling a DG for a retransmission. The first UE 1808 sends the retransmission to the gNB 1810 at 6 and the gNB 1810 forwards the retransmission to the second UE 1812 at 7. The total retransmission time is indicated by 8. It may be seen that this scheme requires significant signaling which may delay the retransmission beyond an acceptable survival time.

The disclosure relates in some aspects using a conditional CG configured for the transmitting UE (Tx UE). If a certain condition is TRUE (e.g., the CG retransmission timer expires or the receiving UE (Rx UE) sends a NACK) a conditional Uu CG is activated automatically, and the Tx UE can retransmit to the gNB. For example, in diagram 1806 of FIG. 18, the first UE 1808 attempts a sidelink transmission on a CG at 1. At 2, the second UE 1812 fails to receive the transmission, so the second UE 1812 sends feedback (e.g., a NACK) at 3. At 4, the first UE 1808 forwards the feedback to the gNB 1810. Thus, at 5, the first UE 1808 knows the condition (sidelink failure) is true and, at 6, the gNB 1810 knows the condition (sidelink failure) is true. Accordingly, the first UE 1808 may transmit the data to the gNB 1810 on a previously allocated conditional CG. The gNB 1810 may forward the data to the second UE 1812 at 8. The total retransmission time is indicated by 9. It may be seen that the retransmission time may be less in this case as compared to the example of diagram 1804.

The wireless PLC use case can thus benefit from the conditional CG in the following way. A conditional CG can be activated on a two-hop Uu path and be conditioned on an SL CG failing. This offers path diversity via a conditional CG that would otherwise involve significant signaling overhead as shown in FIG. 19.

Figure 20:
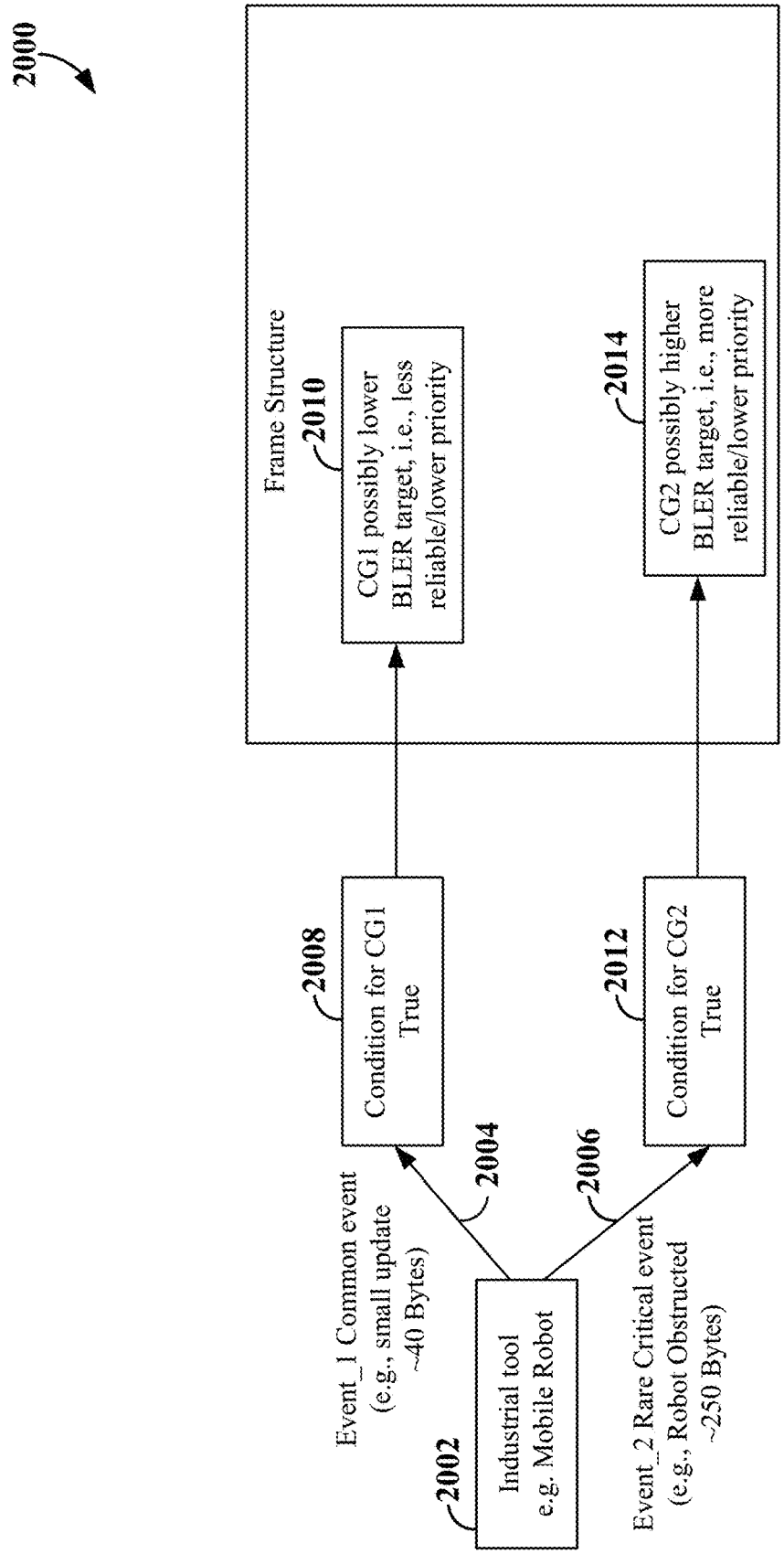
FIG. 20 is a diagram illustrating an example of a payload-dependent conditional configured grant according to some aspects.

A conditional CG can also be used for dynamic path selection as shown in FIG. 20. In this case, by conditioning the SL CG on the SL RSRP, a grant is only activated if the SL is seeing good radio conditions. For the dynamic path selection for wireless PLC shown in FIG. 20, the wireless PLC setup can be set up with a dynamic connection whereby an SL is utilized only if the SL radio conditions are good. Realizing this solution using baseline solutions requires a lot of overhead signaling to decide on the correct path. However, a conditional CG can be utilized to do this path selection automatically without explicit signaling.

The conditional CG idea be extended to SL CG the same way it is used for UL CG possibly using a condition configured by gNB. If the SL is poor, the PLC and gNB will know that from SL CSI report. This satisfies an automatic condition, and an UL CG is activated to transmit on the two-hop path from PLC to gNB. If the SL is good, the PLC and S/A will know that from the CSI-report from the S/A. This satisfies a condition at PLC and S/A and an automatic SL CG is activated.

Figure 19:
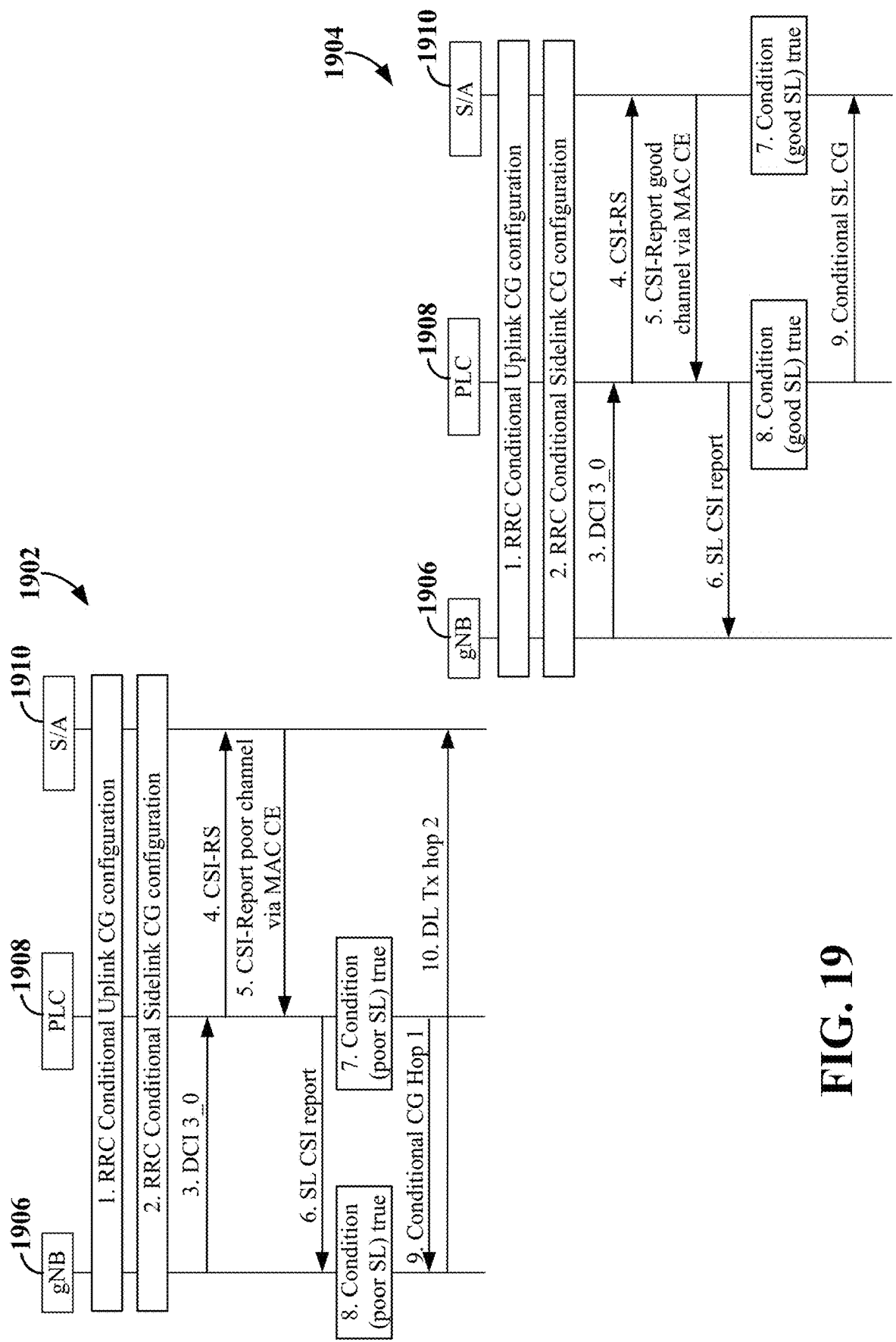
FIG. 19 is a signaling diagram illustrating an example of conditional communication for a programmable logic controller application according to some aspects.

For example, in diagram 1902 of FIG. 19, a conditional UL CG is configured by RRC at 1, along with RRC configuration of a conditional sidelink CG at 2. At 3, a gNB 1906 sends a DCI to a PLC 1908 scheduling the sidelink to an S/A 1910. The PLC 1908 sends a CSI-RS to the S/A 1910 at 4. The S/A 1910 thereby determines that the channel has relatively poor quality and sends a CSI report to the PLC 1908 at 5 (e.g., via a MAC-CE). The PLC 1908 then forwards the CSI report to the gNB at 6. Accordingly, the PLC 1908 knows the condition (poor SL) is true at 7 and the gNB 1906 knows the condition (poor SL) is true at 8. Accordingly, the PLC 1908 may transmit data to the gNB 1906 on a conditional UL CG over a first Uu link at 9. The gNB 1906 may then forward the data to the S/A 1910 via a second Uu link at 10.

Conversely, in diagram 1904 of FIG. 19, a conditional UL CG is configured by RRC at 1, along with RRC configuration of a conditional sidelink CG at 2. At 3, the gNB 1906 sends a DCI to the PLC 1908 scheduling the sidelink to the S/A 1910. The PLC 1908 sends a CSI-RS to the S/A 1910 at 4. The S/A 1910 thereby determines that the channel has relatively good quality and sends a CSI report to the PLC 1908 at 5 (e.g., via a MAC-CE). The PLC 1908 then forwards the CSI report to the gNB at 6. Accordingly, the S/A 1910 knows the condition (good SL) is true at 7 and the PLC 1908 knows the condition (good SL) is true at 8. Accordingly, the PLC 1908 may transmit data to the S/A 1910 on a conditional sidelink CG via the sidelink at 9. Also, by receiving the CSI report It 6, the gNB 1906 will know not to expect a transmission on the conditional UL CG (e.g., discussed at 9 of diagram 1902).

A conditional SL mechanism may be slightly different according to the mode: In Mode 1 (as shown in FIG. 19), the gNB is likely the node configuring the Conditional SL CG. In Mode 2 (not shown in FIG. 19), the PLC (or more generally the Tx UE) is likely to be the node configuring the Conditional SL CG. Thus, that node that configures the SL CG may depend on the specific network configuration.

A condition can also be tied to the message payload as shown in FIG. 20. This may be useful in industrial use cases and other use cases where the message is periodic but there is some randomness in payload. Multiple conditional CGs can be configured to account for different payloads, priorities, how critical the message is, etc. The above discussion referred to a "two-sided" condition, where both the transmitter and the receiver (e.g., UE and gNB for Uu, or UE and UE for SL) know apriori before the grant is activated. Alternatively, the condition can be "one-sided, e.g., known by the transmitter only before a transmission starts. This may be suitable for cases such as where the payload is random to some extent, but the survival time constraint is still stringent. This may be useful to account for rare events that are critical that produce a critical message that needs to be transmitted with low latency and high reliability.

In FIG. 20, an device 2002 (e.g., an industrial tool in one example) may send a relatively small amount of data 2004 for an Event 1 (e.g., a relatively common event) and a larger amount of data 2006 for an Event 2 (e.g., a rarer, more critical event). For the condition 2008 for Event 1, the allocated resources 2010 may be scheduled with a lower block error rate (BLER) target since this transmission may have a relatively low priority (e.g., it is acceptable to have lower reliability for this transmission). Conversely, for the condition 2012 for Event 2, the allocated resources 2014 may be scheduled with a higher BLER target since this transmission may have a relatively low high (e.g., this transmission needs a higher reliability).

The disclosure relates in some aspects to a configured grant condition RRC Information Element (IE) that holds several fields such as: CGfailure: configured if the condition is LBT failure of another CG. RSRPthresholdabove/RSRPthresholdbelow. PayloadThresholdAbove/PayloadThresholdBelow. These fields can also contain other information if new conditions corresponding to new use cases arise. FIGS. 21-23 illustrate an example of RRC InformationElement ConfiguredGrantCondition.

Figure 24:
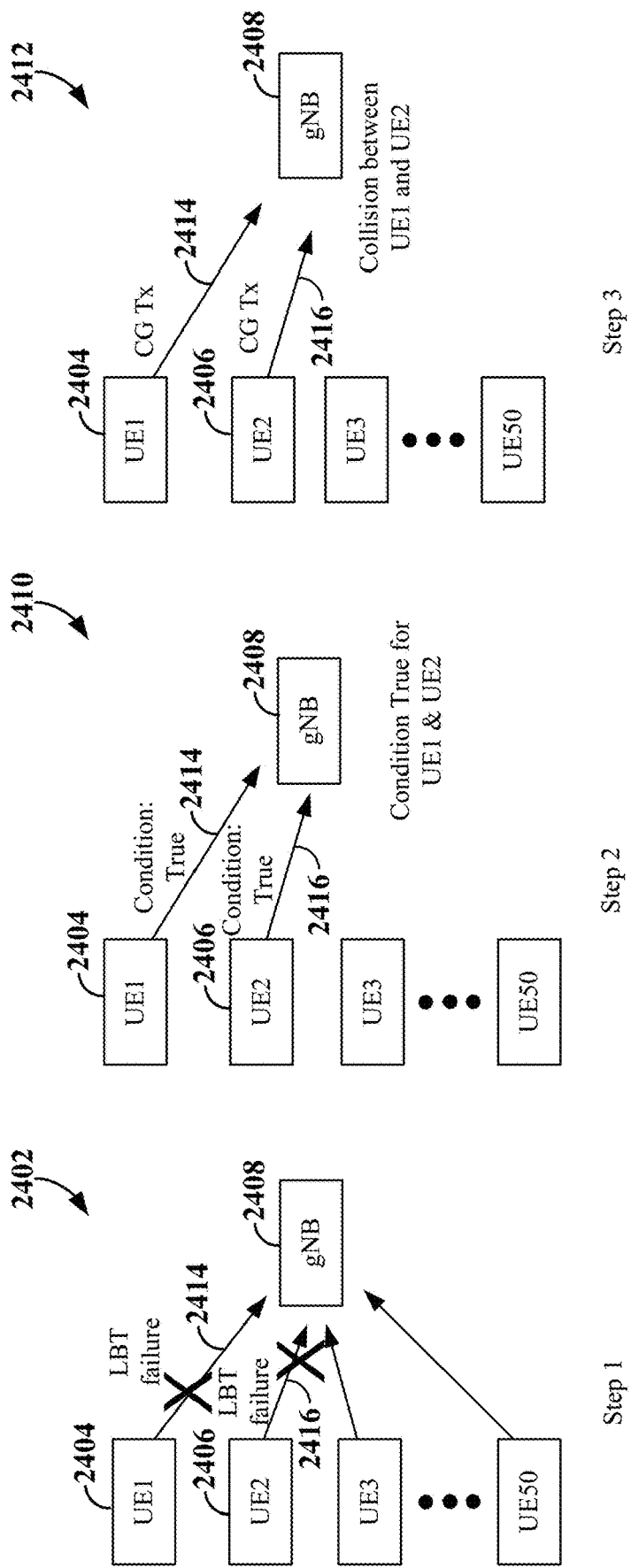
FIG. 24 is a diagram illustrating an example of a collision on a configured grant according to some aspects.

In some examples, a conditional CG can be useful for configuring a single grant for retransmissions by multiple UEs. Since transmission failures are rare and independent, while it may be somewhat likely for a single UE to fail an initial transmission, it is very unlikely that more than one UE would need to use the grant at the same time. In other words, failure of one UE happens with a small probability and failure of two or more UEs happen with a negligible probability. In this case, the rarity of the condition essentially guarantees that the UEs will not collide when attempting to use the overbooked grant. However, collisions can still happen as shown in FIG. 24. In a first diagram 2402 (Step 1), a first UE 2404 experiences an LBT failure for a first transmission 2414 to a gNB 2408, while a second UE 2406 also experiences an LBT failure for a second transmission 2416 to the gNB 2408. Thus, as shown in the diagram 2410 (Step 2), the condition (LBT failure) will be true for both UEs. Consequently, as shown in the diagram 2412 (Step 3), the gNB 2408 may experience a conditional CG collision for these UEs.

To ensure that a conditional grant is useful when it is configured for an overbooked resource upon a rare failure event, steps may be taken to account for the case where two UEs (or more, although that may be very highly unlikely) have a TRUE condition for the same resource at the same time as shown in FIG. 24. The disclosure relates in some aspects to solutions to avoid possible collisions for an overbooked conditional CG instance.

Figure 25:
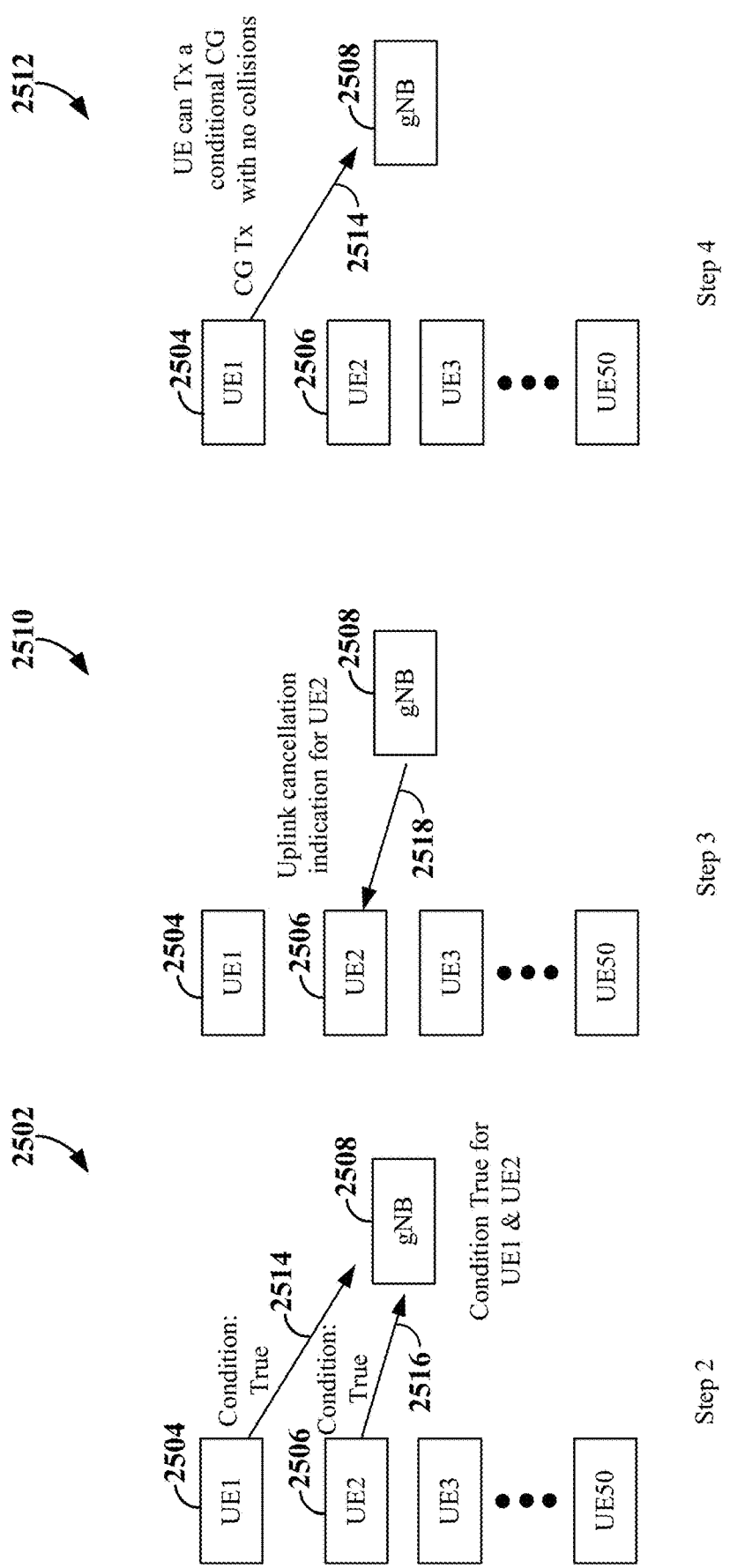
FIG. 25 is a diagram illustrating an example of a collision pre-emption scheme according to some aspects.

As shown in a first diagram 2502 (Step 2) of FIG. 25, a gNB 2508 can detect a collision (by tracking the condition for all UEs). As shown in a second diagram 2510 (Step 3), the gNB 2508 and send an uplink cancellation indication 2518 for all UEs except for one UE to avoid collisions. If gNB knows that the condition is TRUE for more than one UE, the gNB can simply cancel the grant for all UEs except for that one UE. Thus, as shown in a third diagram 2512 (Step 4), the gNB 2508 can receive data from a single UE on a conditional CG without collisions. In this case, the gNB 2508 may allow the canceled UE to wait for the next CG opportunity or the gNB 2508 may schedule a DG for that UE.

Figure 26:
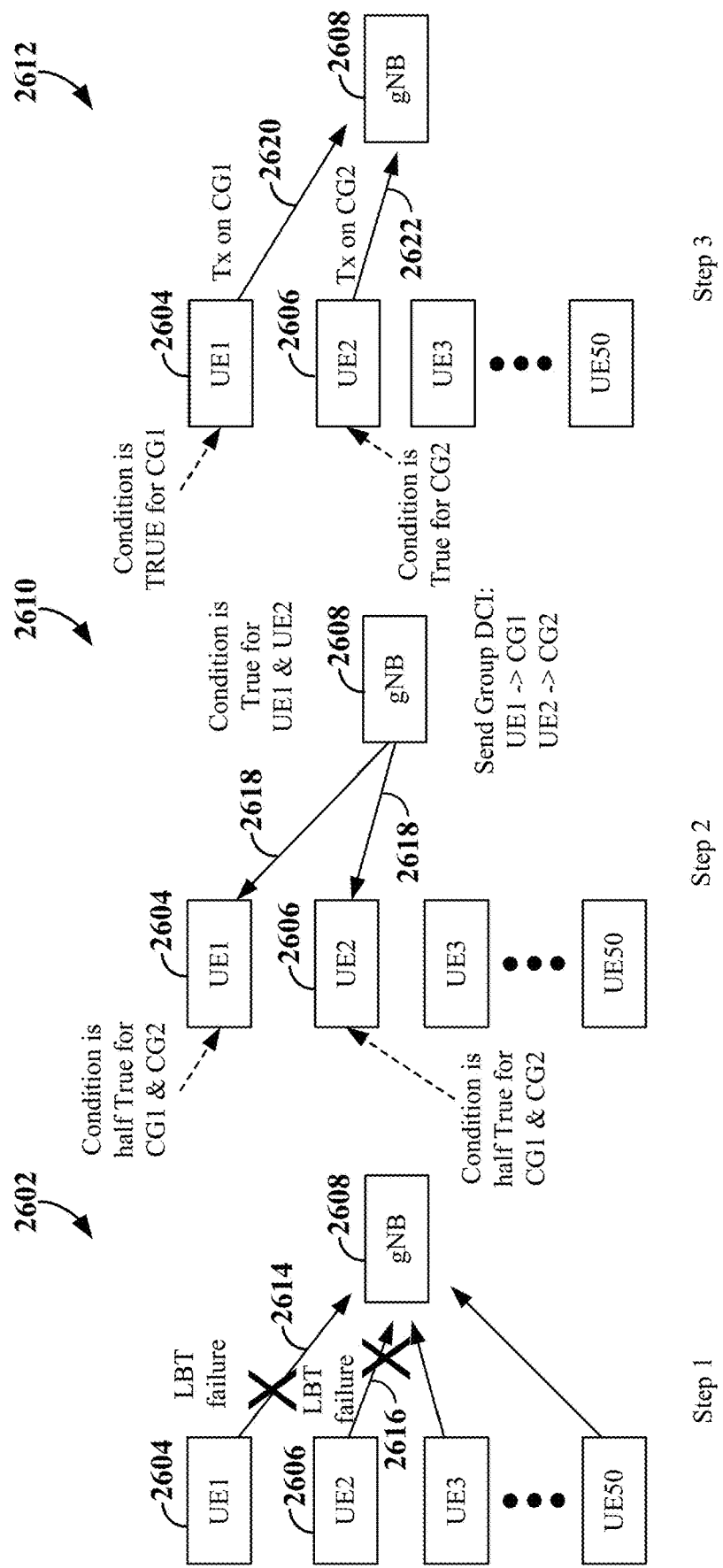
FIG. 26 is a diagram illustrating an example of a using a group downlink control information (DCI) to avoid a collision according to some aspects.

In the example of FIG. 26, a UE can be configured with multiple conditional CGs (e.g., CG1 and CG2). In addition, the condition can be extended to a logical: Condition 1 AND Condition 2. Condition 1 can still be for example, LBT failure (e.g., at a certain CG instance) and Condition 2 can be tied to a group DCI indication from the gNB. Thus, a condition may include two components (e.g., an LBT failure AND an indication from a group DCI). This way, a UE can have a TRUE Condition 1 for multiple grants and wait for gNB to obtain Condition 2. The gNB can then manage Condition 2 between UEs to guarantee a collision free schedule. This is an efficient way to allow the gNB to schedule all failed UEs using a single broadcast DCI (instead of individual UCIs), thereby conserving network capacity. For example, diagram 2602 of FIG. 6 depicts potential collision scenario (e.g., as discussed above at FIGS. 24 and 25). In this case, however, as shown at diagram 2610, the condition is only half true for each UE since each UE can use one of two CGs. Here, the gNB 2608 determines that the condition is true for both UEs, however, the gNB 2608 can send a group DCI 2618 that specifies that the UE 2604 is to use CG1 and the UE 2606 is to use CG2). Consequently, at diagram 2612, the new corresponding condition will be true for each UE. Thus, the UE 2604 uses CG1 for a transmission 2620 to the gNB 2608 and the UE 2606 uses CG2 for a transmission 2622 to the gNB 2608.

This means that a single DCI can indicate to different UEs which conditional CGs to use to ensure no collisions happen. Also, by using a group DCI, this may scale favorably with the number of UEs. Another potential advantage is that this involves an activation of a grant rather than scheduling a retransmission. Therefore, the gNB does not need to know the retransmission HARQ IDs and can better react to LBT failures, as opposed to a dynamic grant scenario where the gNB needs to know the HARQ ID.

Figure 27:
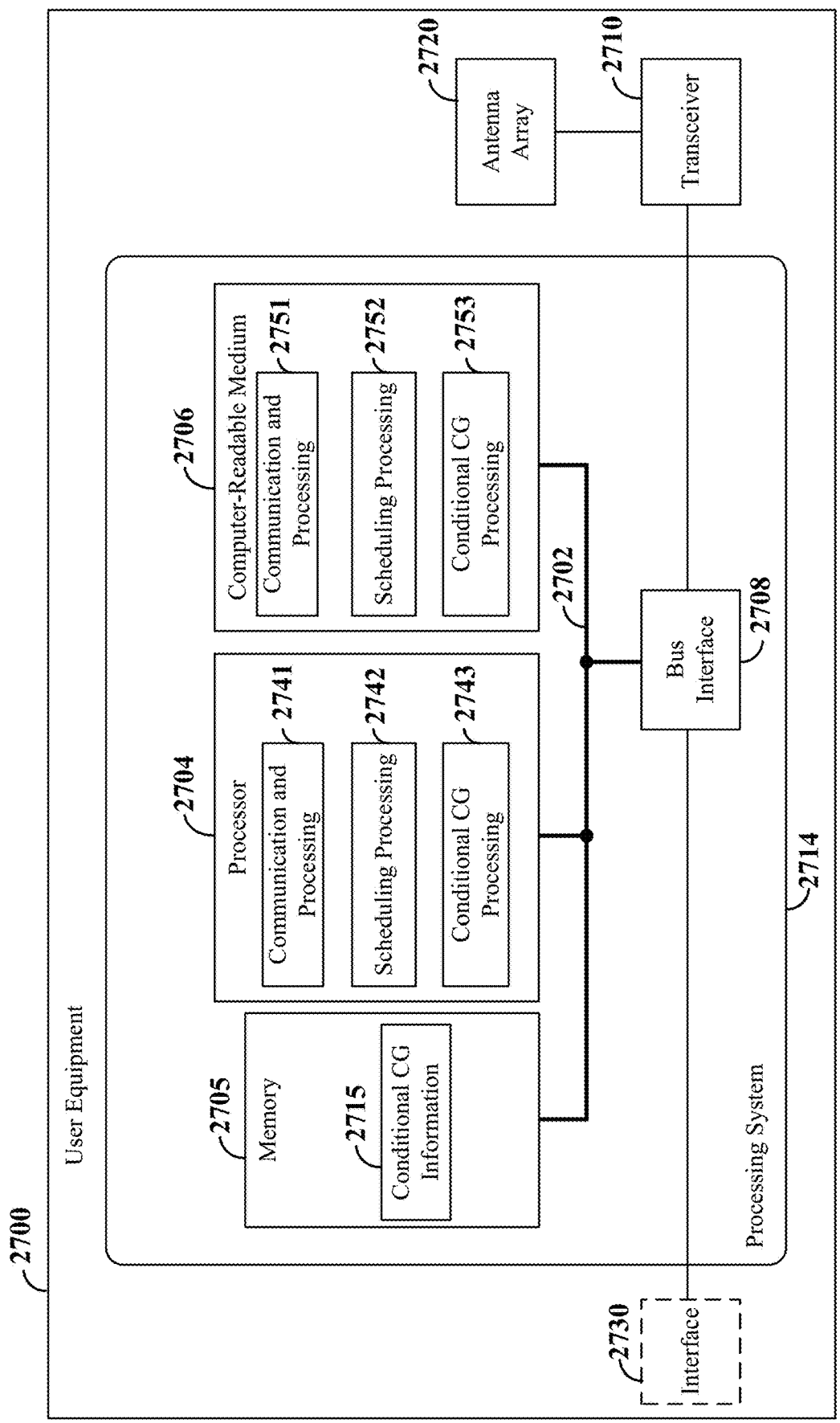
FIG. 27 is a block diagram conceptually illustrating an example of a hardware implementation for a user equipment employing a processing system according to some aspects.

FIG. 27 is a block diagram illustrating an example of a hardware implementation for a UE 2700 employing a processing system 2714. For example, the UE 2700 may be a device configured to wirelessly communicate with a base station, as discussed in any one or more of FIGS. 1-26. In some implementations, the UE 2700 may correspond to any of the UEs, scheduled entities, D2D devices, sidelink devices, programmable logic controllers (PLCs), or sensor/actuators (S/As) shown in any one or more of FIGS. 1, 2, 4-10, 14, 17-19, and 24-26.

In accordance with various aspects of the disclosure, an element, or any portion of an element, or any combination of elements may be implemented with the processing system 2714. The processing system 2714 may include one or more processors 2704. Examples of processors 2704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2700 may be configured to perform any one or more of the functions described herein. That is, the processor 2704, as utilized in a UE 2700, may be used to implement any one or more of the processes and procedures described herein.

The processor 2704 may in some instances be implemented via a baseband or modem chip and in other implementations, the processor 2704 may include a number of devices distinct and different from a baseband or modem chip (e.g., in such scenarios as may work in concert to achieve the examples discussed herein). And as mentioned above, various hardware arrangements and components out-side of a baseband modem processor can be used in implementations, including RF-chains, power amplifiers, modulators, buffers, interleavers, adders/summers, etc.

In this example, the processing system 2714 may be implemented with a bus architecture, represented generally by the bus 2702. The bus 2702 may include any number of interconnecting buses and bridges depending on the specific application of the processing system 2714 and the overall design constraints. The bus 2702 communicatively couples together various circuits including one or more processors (represented generally by the processor 2704), a memory 2705, and computer-readable media (represented generally by the computer-readable medium 2706). The bus 2702 may also link various other circuits such as timing sources, peripherals, voltage regulators, and power management circuits, which are well known in the art, and therefore, will not be described any further. A bus interface 2708 provides an interface between the bus 2702 and a transceiver 2710 and an antenna array 2720, and an interface between the bus 2702 and an interface 2730. The transceiver 2710 provides a communication interface or means for communicating with various other apparatus over a wireless transmission medium. The interface 2730 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 2730 may include a user interface (e.g., keypad, display, speaker, microphone, joystick). Of course, such a user interface is optional, and may be omitted in some examples, such as an IoT device.

The processor 2704 is responsible for managing the bus 2702 and general processing, including the execution of software stored on the computer-readable medium 2706. The software, when executed by the processor 2704, causes the processing system 2714 to perform the various functions described below for any particular apparatus. The computer-readable medium 2706 and the memory 2705 may also be used for storing data that is manipulated by the processor 2704 when executing software. For example, the memory 2705 may include conditional CG information 2715 (e.g., an indication of a condition or set of conditions, an indication of allocated conditional periodic resources, etc.) that may be used by the processor 2704 for transmission operations as discussed herein.

One or more processors 2704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2706.

The computer-readable medium 2706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2706 may reside in the processing system 2714, external to the processing system 2714, or distributed across multiple entities including the processing system 2714. The computer-readable medium 2706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 2700 may be configured to perform any one or more of the operations described herein (e.g., as described above in conjunction with FIGS. 1-26 and as described below in conjunction with FIG. 28). In some aspects of the disclosure, the processor 2704, as utilized in the UE 2700, may include circuitry configured for various functions.

The processor 2704 may include communication and processing circuitry 2741. The communication and processing circuitry 2741 may be configured to communicate with a base station, such as a gNB. The communication and processing circuitry 2741 may include one or more hardware components that provide the physical structure that performs various processes related to wireless communication (e.g., signal reception and/or signal transmission) as described herein. The communication and processing circuitry 2741 may further include one or more hardware components that provide the physical structure that performs various processes related to signal processing (e.g., processing a received signal and/or processing a signal for transmission) as described herein. In some examples, the communication and processing circuitry 2741 may include two or more transmit/receive chains. The communication and processing circuitry 2741 may further be configured to execute communication and processing software 2751 included on the computer-readable medium 2706 to implement one or more functions described herein.

In some implementations where the communication involves receiving information, the communication and processing circuitry 2741 may obtain information from a component of the UE 2700 (e.g., from the transceiver 2710 that receives the information via radio frequency signaling or some other type of signaling suitable for the applicable communication medium), process (e.g., decode) the information, and output the processed information. For example, the communication and processing circuitry 2741 may output the information to another component of the processor 2704, to the memory 2705, or to the bus interface 2708. In some examples, the communication and processing circuitry 2741 may receive one or more of signals, messages, other information, or any combination thereof. In some examples, the communication and processing circuitry 2741 may receive information via one or more channels. In some examples, the communication and processing circuitry 2741 may include functionality for a means for receiving. In some examples, the communication and processing circuitry 2741 may include functionality for a means for decoding.

In some implementations where the communication involves sending (e.g., transmitting) information, the communication and processing circuitry 2741 may obtain information (e.g., from another component of the processor 2704, the memory 2705, or the bus interface 2708), process (e.g., encode) the information, and output the processed information. For example, the communication and processing circuitry 2741 may output the information to the transceiver 2710 (e.g., that transmits the information via radio frequency signaling or some other type of signaling suitable for the applicable communication medium). In some examples, the communication and processing circuitry 2741 may send one or more of signals, messages, other information, or any combination thereof. In some examples, the communication and processing circuitry 2741 may send information via one or more channels. In some examples, the communication and processing circuitry 2741 may include functionality for a means for sending (e.g., a means for transmitting). In some examples, the communication and processing circuitry 2741 may include functionality for a means for encoding.

The processor 2704 may include scheduling processing circuitry 2742 configured to perform scheduling processing-related operations as discussed herein (e.g., as described above in conjunction with FIGS. 11-26). The scheduling processing circuitry 2742 may be configured to execute scheduling processing software 2752 included on the computer-readable medium 2706 to implement one or more functions described herein.

The scheduling processing circuitry 2742 may provide the functionality of a means for receiving scheduling information. For example, the scheduling processing circuitry 2742 may be configured to monitor resources schedules (e.g., a channel such as a PDCCH or a PDSCH) for scheduling messages (e.g., an RRC message, a DCI, a MAC-CE, etc.) transmitted to the user equipment 2700 by a base station.

The scheduling processing circuitry 2742 may provide the functionality of a means for receiving an indication of a condition. For example, the scheduling processing circuitry 2742 may be configured to monitor resources schedules (e.g., a channel such as a PDCCH or a PDSCH) for a message (e.g., an RRC message, a MAC-CE, etc.) transmitted to the user equipment 2700 by a base station, and then parse the message to determine whether the message includes an indication of a condition.

The processor 2704 may include conditional CG processing circuitry 2743 configured to perform conditional CG processing-related operations as discussed herein (e.g., as described above in conjunction with FIGS. 11-26). The conditional CG processing circuitry 2743 may further be configured to execute conditional CG processing software 2753 included on the computer-readable medium 2706 to implement one or more functions described herein.

The conditional CG processing circuitry 2743 may provide functionality for a means for selectively transmitting data. For example, the conditional CG processing circuitry 2943 may be configured to determine that an application running on the user equipment 2700 has data to send to the network, and then check the current state of an associated condition to determine whether the condition was met. If the condition was met, the conditional CG processing circuitry 2743 may invoke transmission of the data during a corresponding conditional CG resource. If the condition was not met, the conditional CG processing circuitry 2743 may abstain from transmitting data on that conditional CG resource (e.g., and wait for the next periodic resource to transmit the data).

Figure 28:
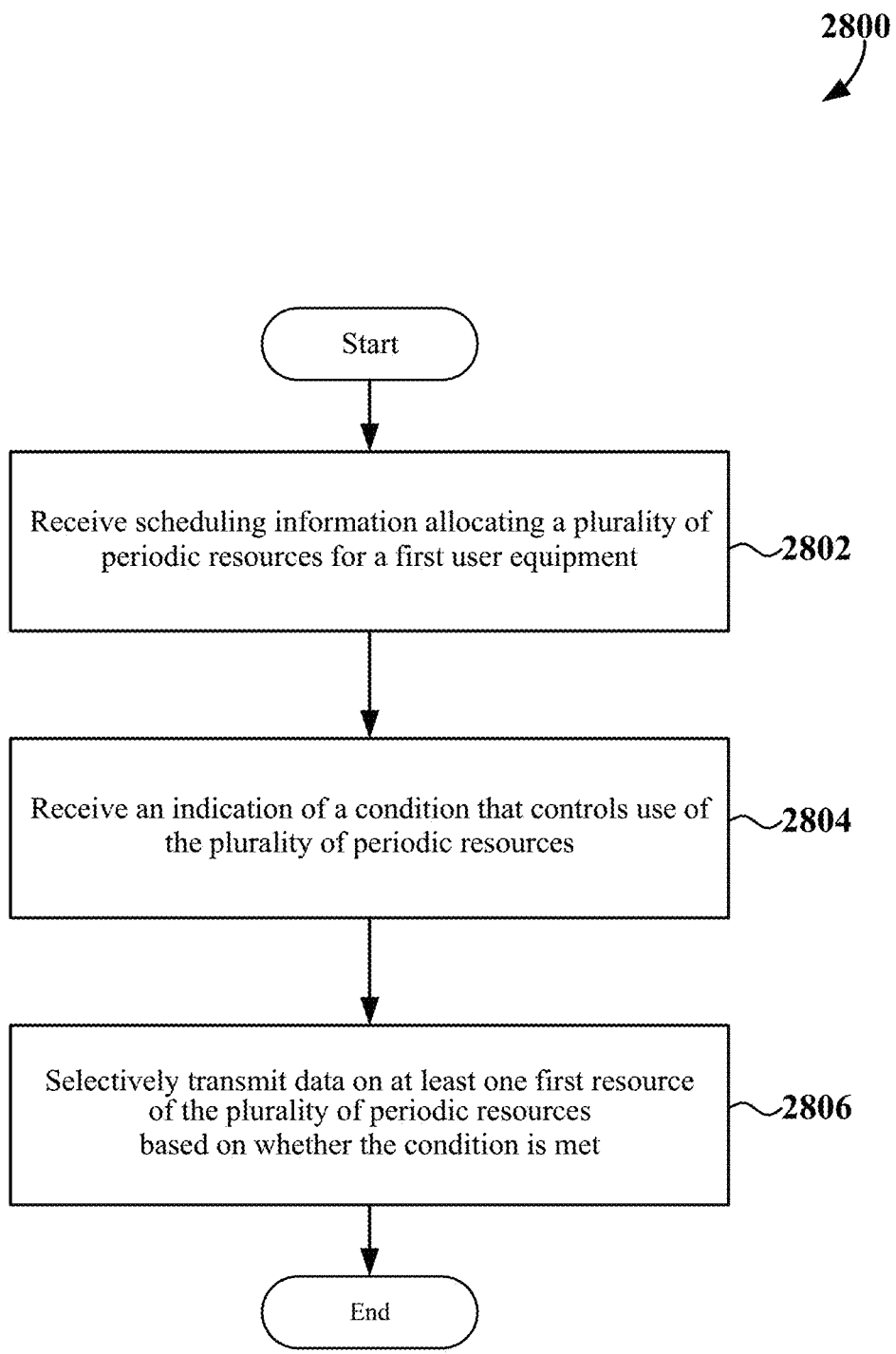
FIG. 28 is a flow chart illustrating an example of conditional data transmission according to some aspects.

FIG. 28 is a flow chart illustrating an example method 2800 for wireless communication according to some aspects. As described below, some or all illustrated features may be omitted in a particular implementation within the scope of the present disclosure, and some illustrated features may not be required for implementation of all examples. In some examples, the method 2800 may be carried out by the user equipment 2700 illustrated in FIG. 27 or by any suitable apparatus or means for carrying out the functions or algorithm described below.

At block 2802, a user equipment may receive scheduling information allocating a plurality of periodic resources for the user equipment. For example, the scheduling processing circuitry 2742 together with the communication and processing circuitry 2741 and the transceiver 2710, shown and described above in connection with FIG. 27, may provide a means to receive scheduling information allocating a plurality of periodic resources for the user equipment.

In some examples, the scheduling information may include a conditional configured grant that allocates the plurality of periodic resources for the user equipment.

At block 2804, the user equipment may receive an indication of a condition that controls use of the plurality of periodic resources. For example, the scheduling processing circuitry 2742 together with the communication and processing circuitry 2741 and the transceiver 2710, shown and described above in connection with FIG. 27, may provide a means to receive an indication of a condition that controls use of the plurality of periodic resources.

In some examples, the condition may include at least one of an application survival time condition, a listen-before talk condition, a signal strength condition, a cell connectivity condition, a sidelink connectivity condition, a channel condition, a payload condition, or a combination thereof.

In some examples, the user equipment may receive a radio resource control message that includes the scheduling information and the indication. In some examples, the indication may include a radio resource control configured grant condition information element. In some examples, the radio resource control message activates the plurality of periodic resources for use by the user equipment. In some examples, the user equipment may receive downlink control information that activates the plurality of periodic resources for use by the user equipment.

At block 2806, the user equipment may selectively transmit data on at least one first resource of the plurality of periodic resources based on whether the condition is met. For example, the conditional CG processing circuitry 2743 together with the communication and processing circuitry 2741 and the transceiver 2710, shown and described above in connection with FIG. 27, may provide a means to selectively transmit data on at least one first resource of the plurality of periodic resources based on whether the condition is met.

In some examples, the data is a retransmission of an attempted first transmission on a second resource of the plurality of periodic resources.

In some examples, to selectively transmit the data, the user equipment may transmit the data on the at least one first resource when the condition is met. In some examples, to selectively transmit the data, the user equipment may abstain from transmitting the data on the at least one first resource when the condition is not met. In some examples, to selectively transmit the data, the user equipment may transmit the data on a specified number of resources of the at least one first resource. In some examples, to selectively transmit the data, the user equipment may transmit the data on the at least one first resource until the condition is deactivated.

In some examples, the condition is associated with an application survival time. In some examples, to selectively transmit the data, the user equipment may transmit the data on the at least one first resource prior to expiry of a timer associated with the application survival time.

In some examples, the condition may include a listen-before talk condition. In some examples, to selectively transmit the data, the user equipment may transmit the data on the at least one first resource when a listen-before talk failure occurs. In some examples, to selectively transmit the data, the user equipment may transmit the data on the at least one first resource responsive to a listen-before talk failure.

In some examples, the condition may include a signal strength condition. In some examples, to selectively transmit the data, the user equipment may transmit the data on the at least one first resource when a measured signal strength is greater than a threshold associated with the signal strength condition. In some examples, to selectively transmit the data, the user equipment may determine that a measured signal strength is greater than a threshold associated with the signal strength condition, and transmit the data on the at least one first resource responsive to the determination that the measured signal strength is greater than the threshold associated with the signal strength condition.

In some examples, the condition may include a first signal strength condition and a second signal strength condition. In some examples, to selectively transmit the data, the user equipment may transmit the data on the at least one first resource when a measured signal strength is greater than a threshold associated with the first signal strength condition. In some examples, to selectively transmit the data, the user equipment may determine that a measured signal strength is greater than a threshold associated with the first signal strength condition, and transmit the data on the at least one first resource responsive to the determination that the measured signal strength is greater than the threshold associated with the signal strength condition. In some examples, to selectively transmit the data, the user equipment may transmit the data on a second resource of the plurality of periodic resources when a measured signal strength is less than a first threshold associated with the first signal strength condition and greater than a second threshold associated with the second signal strength condition. In some examples, to selectively transmit the data, the user equipment may determine that a measured signal strength is less than a first threshold associated with the first signal strength condition and greater than a second threshold associated with the second signal strength condition, and transmit the data on the at least one first resource responsive to the determination that the measured signal strength is less than the first threshold associated with the first signal strength condition and greater than the second threshold associated with the second signal strength condition.

In some examples, the condition is associated with a communication between the user equipment and a first cell. In some examples, to selectively transmit the data, the user equipment may transmit the data on the at least one first resource to a second cell when there is a failure of the communication between the user equipment and the first cell. In some examples, the first cell is a master node for a dual connectivity mode of operation for the user equipment, the first cell is for a packet data convergence protocol (PDCP) duplication mode of operation for the user equipment, or the first cell is for a carrier aggregation mode of operation for the user equipment. In some examples, the second cell is a secondary node for the dual connectivity mode of operation for the user equipment, the second cell is for the packet data convergence protocol (PDCP) duplication mode of operation for the user equipment, or the second cell is for the carrier aggregation mode of operation for the user equipment.

In some examples, the condition is associated with a communication between the user equipment and a sidelink device. In some examples, to selectively transmit the data, the user equipment may transmit the data on the at least one first resource to a serving base station of the user equipment when there is a failure of the communication between the user equipment and the sidelink device.

In some examples, the condition may include a channel condition associated with a communication between the user equipment and a wireless communication device. In some examples, to selectively transmit the data, the user equipment may transmit the data on the at least one first resource to a serving base station of the user equipment when the channel condition makes unacceptable (is unacceptable for) the communication between the user equipment and the wireless communication device. In some examples, to selectively transmit the data, the user equipment may transmit the data on the at least one first resource to the wireless communication device when the channel condition makes acceptable (is acceptable for) the communication between the user equipment and the wireless communication device.

In some examples, the condition may include a first condition and a second condition. In some examples, to selectively transmit the data, the user equipment may transmit the data on the at least one first resource when the first condition is met, or transmit the data on a second resource of the plurality of periodic resources when the second condition is met.

In some examples, the user equipment may receive group downlink control information specifying that the user equipment is to use the at least one first resource. In this case, to selectively transmit the data, the user equipment may transmit the data on the at least one first resource.

Figure 29:
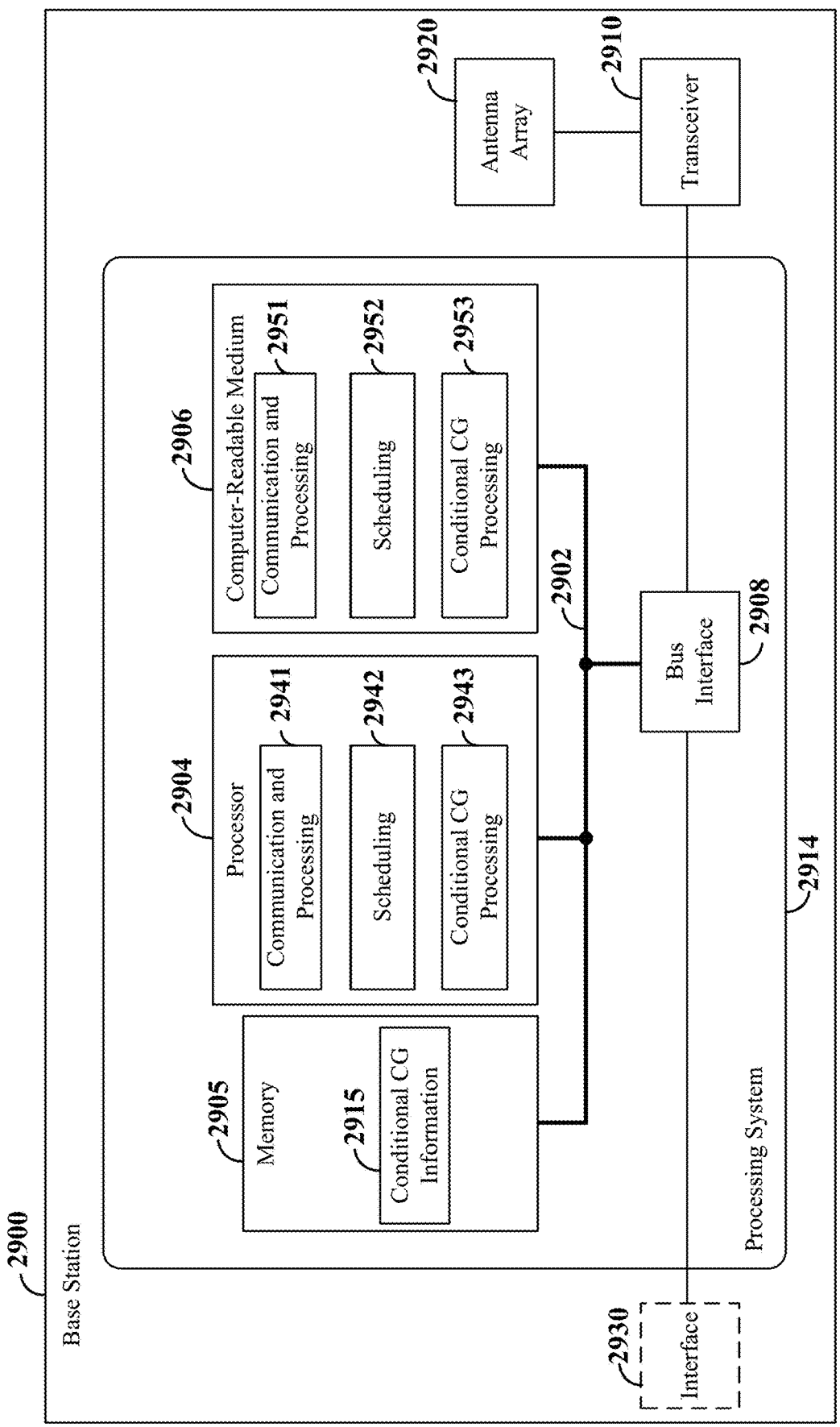
FIG. 29 is a block diagram conceptually illustrating an example of a hardware implementation for a base station employing a processing system according to some aspects.

FIG. 29 is a conceptual diagram illustrating an example of a hardware implementation for base station (BS) 2900 employing a processing system 2914. In some implementations, the BS 2900 may correspond to any of the BSs (e.g., gNBs) or scheduling entities shown in any of FIGS. 1, 2, 4-10, 14, 17-19, and 24-26.

In accordance with various aspects of the disclosure, an element, or any portion of an element, or any combination of elements may be implemented with the processing system 2914. The processing system may include one or more processors 2904. The processing system 2914 may be substantially the same as the processing system 2714 illustrated in FIG. 27, including a bus interface 2908, a bus 2902, memory 2905, a processor 2904, a computer-readable medium 2906, a transceiver 2910, and an antenna array 2920. The memory 2905 may store resource conditional CG information 2915 (e.g., an indication of a condition or set of conditions, an indication of allocated conditional periodic resources, etc.) used by the processor 2904 for communication operations as discussed herein. Furthermore, the BS 2900 may include an interface 2930 (e.g., a network interface) that provides a means for communicating with at least one other apparatus within a core network and with at least one radio access network.

The BS 2900 may be configured to perform any one or more of the operations described herein (e.g., as described above in conjunction with FIGS. 1-26 and as described below in conjunction with FIG. 30). In some aspects of the disclosure, the processor 2904, as utilized in the BS 2900, may include circuitry configured for various functions.

The processor 2904 may be configured to generate, schedule, and modify a resource assignment or grant of time-frequency resources (e.g., a set of one or more resource elements). For example, the processor 2904 may schedule time-frequency resources within a plurality of time division duplex (TDD) and/or frequency division duplex (FDD) subframes, slots, and/or mini-slots to carry user data traffic and/or control information to and/or from multiple UEs. The processor 2904 may be configured to schedule resources for the transmission of downlink signals and/or resources for the transmission of uplink signals. In some examples, this or other scheduling entity functionality as described herein may be implemented in a sidelink device (e.g., that schedules a sidelink communication with another sidelink device).

In some aspects of the disclosure, the processor 2904 may include communication and processing circuitry 2941. The communication and processing circuitry 2944 may be configured to communicate with a UE. The communication and processing circuitry 2941 may include one or more hardware components that provide the physical structure that performs various processes related to communication (e.g., signal reception and/or signal transmission) as described herein. The communication and processing circuitry 2941 may further include one or more hardware components that provide the physical structure that performs various processes related to signal processing (e.g., processing a received signal and/or processing a signal for transmission) as described herein. The communication and processing circuitry 2941 may further be configured to execute communication and processing software 2951 included on the computer-readable medium 2906 to implement one or more functions described herein.

The communication and processing circuitry 2941 may further be configured to transmit a message to a UE and/or receive a message from a UE. For example, a downlink message be included in a MAC-CE carried in a PDSCH, a DCI carried in a PDCCH or PDSCH, or an RRC message. In addition, an uplink message be included in a MAC-CE carried in a PUSCH, UCI carried in a PUCCH, a random access message, or an RRC message.

In some implementations wherein the communication involves receiving information, the communication and processing circuitry 2941 may obtain information from a component of the BS 2900 (e.g., from the transceiver 2910 that receives the information via radio frequency signaling or some other type of signaling suitable for the applicable communication medium), process (e.g., decode) the information, and output the processed information. For example, the communication and processing circuitry 2941 may output the information to another component of the processor 2904, to the memory 2905, or to the bus interface 2908. In some examples, the communication and processing circuitry 2941 may receive one or more of signals, messages, other information, or any combination thereof. In some examples, the communication and processing circuitry 2941 may receive information via one or more channels. In some examples, the communication and processing circuitry 2941 may include functionality for a means for receiving. In some examples, the communication and processing circuitry 2941 may include functionality for a means for decoding.

In some implementations wherein the communication involves sending (e.g., transmitting) information, the communication and processing circuitry 2941 may obtain information (e.g., from another component of the processor 2904, the memory 2905, or the bus interface 2908), process (e.g., encode) the information, and output the processed information. For example, the communication and processing circuitry 2941 may output the information to the transceiver 2910 (e.g., that transmits the information via radio frequency signaling or some other type of signaling suitable for the applicable communication medium). In some examples, the communication and processing circuitry 2941 may send one or more of signals, messages, other information, or any combination thereof. In some examples, the communication and processing circuitry 2941 may send information via one or more channels. In some examples, the communication and processing circuitry 2941 may include functionality for a means for sending (e.g., a means for transmitting). In some examples, the communication and processing circuitry 2941 may include functionality for a means for encoding.

The processor 2904 may include scheduling circuitry 2942 configured to perform scheduling-related operations as discussed herein (e.g., one or more of the operations described in conjunction with FIGS. 11-26). The scheduling circuitry 2942 may be configured to execute scheduling software 2952 included on the computer-readable medium 2906 to implement one or more functions described herein.

The scheduling circuitry 2942 may provide the functionality of a means for transmitting scheduling information. For example, the scheduling circuitry 2942 may be configured to determine whether to allocate conditional resources for a UE (e.g., based on the traffic requirements of an application on the UE), elect to allocate the resources, and transmit an indication of those resources (e.g., in a DCI, a MAC-CE, etc.) to the UE on a channel (e.g., a PDCCH) scheduled for the UE.

The scheduling circuitry 2942 may provide the functionality of a means for transmitting an indication of a condition. For example, the scheduling circuitry 2942 may be configured to determine that a particular type of condition is to be specified for a particular type of traffic (e.g., NR-U traffic, sidelink traffic, etc.), and then transmit an indication of this condition (e.g., in a DCI, a MAC-CE, etc.) to the UE on a channel (e.g., a PDCCH) scheduled for the UE.

The processor 2904 may include conditional CG processing circuitry 2943 configured to perform conditional CG processing-related operations as discussed herein (e.g., one or more of the operations described in conjunction with FIGS. 11-26). The conditional CG processing circuitry 2943 may be configured to execute conditional CG processing software 2953 included on the computer-readable medium 2906 to implement one or more functions described herein.

The conditional CG processing circuitry 2943 may provide functionality for a means for selectively receiving data. For example, the conditional CG processing circuitry 2943 may be configured to determine that data for an application running on a UE is expected to be received at a certain time, and then check the current state of an associated condition to determine whether the condition was met. If the condition was met, the conditional CG processing circuitry 2943 may invoke reception of the data during a corresponding conditional CG resource. If the condition was not met, the conditional CG processing circuitry 2943 may abstain from receiving data on that conditional CG resource and, in some cases, may schedule other data on that conditional CG resource (e.g., if high priority traffic such as ultra-reliable low-latency communication (URLLC) traffic needs to be communicated to or from a UE).

Figure 30:
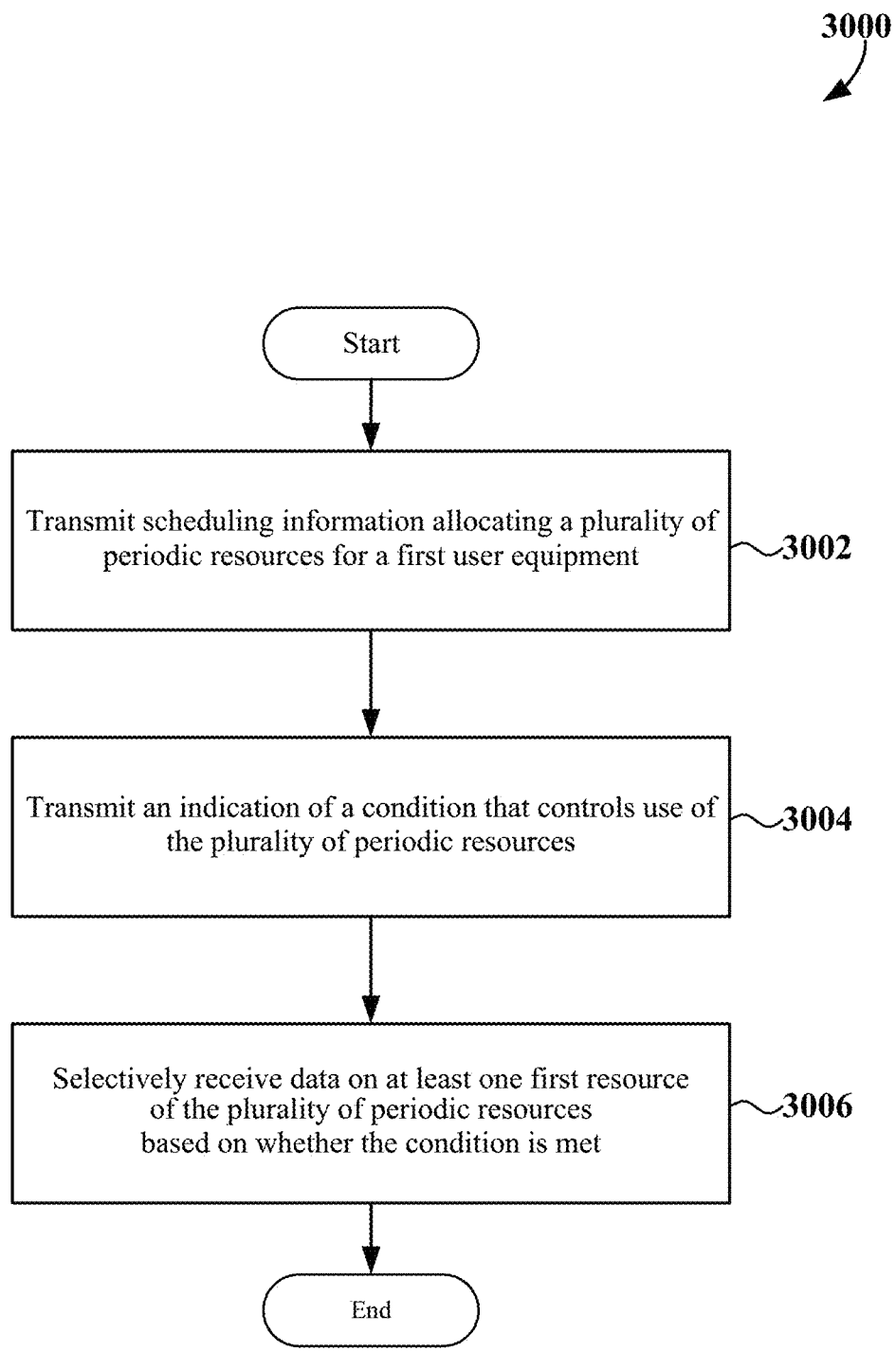
FIG. 30 is a flow chart illustrating an example of conditional data reception parameter according to some aspects.

FIG. 30 is a flow chart illustrating an example method 3000 for wireless communication according to some aspects. As described below, some or all illustrated features may be omitted in a particular implementation within the scope of the present disclosure, and some illustrated features may not be required for implementation of all examples. In some examples, the method 3000 may be carried out by the base station 2900 illustrated in FIG. 29 or by any suitable apparatus or means for carrying out the functions or algorithm described below.

At block 3002, a base station may transmit scheduling information allocating a plurality of periodic resources for a first user equipment. For example, the scheduling circuitry 2942 together with the communication and processing circuitry 2941 and the transceiver 2910, shown and described above in connection with FIG. 29, may provide a means to transmit scheduling information allocating a plurality of periodic resources for a first user equipment.

In some examples, the scheduling information may include a conditional configured grant that allocates the plurality of periodic resources for the user equipment.

At block 3004, the base station may transmit an indication of a condition that controls use of the plurality of periodic resources. For example, the scheduling circuitry 2942 together with the communication and processing circuitry 2941 and the transceiver 2910, shown and described above in connection with FIG. 29, may provide a means to transmit an indication of a condition that controls use of the plurality of periodic resources.

In some examples, the condition may include at least one of an application survival time condition, a listen-before talk condition, a signal strength condition, a cell connectivity condition, a sidelink connectivity condition, a channel condition, a payload condition, or a combination thereof.

In some examples, the base station may transmit a radio resource control message that includes the scheduling information and the indication, and the indication may include a radio resource control configured grant condition information element. In some examples, the radio resource control message activates the plurality of periodic resources for use by the first user equipment. In some examples, the base station may transmit control information that activates the plurality of periodic resources for use by the first user equipment.

At block 3006, the base station may selectively receive data on at least one first resource of the plurality of periodic resources based on whether the condition is met. For example, the conditional CG processing circuitry 2943 together with the communication and processing circuitry 2941 and the transceiver 2910, shown and described above in connection with FIG. 29, may provide a means to selectively receive data on at least one first resource of the plurality of periodic resources based on whether the condition is met.

In some examples, to selectively receive the data, the base station may receive the data on the at least one first resource when the condition is met, or abstain from receiving the data on the at least one first resource when the condition is not met.

In some examples, to selectively receive the data, the base station may receive the data on the at least one first resource when the condition is met. In some examples, to selectively receive the data, the base station may abstain from receiving the data on the at least one first resource when the condition is not met. In some examples, to selectively receive the data, the base station may receive the data on a specified number of resources of the at least one first resource. In some examples, to selectively receive the data, the base station may receive the data on the at least one first resource until the condition is deactivated.

In some examples, the scheduling information may include a conditional configured grant that allocates the plurality of periodic resources for the first user equipment.

In some examples, the condition is associated with an application survival time. In some examples, to selectively receive the data, the base station may monitor for the data on the at least one first resource when a data transmission is not received from the first user equipment on a second resource of the plurality of periodic resources.

In some examples, the condition may include a listen-before talk condition. In some examples, to selectively receive the data, the base station may monitor for the data on the at least one first resource when a data transmission is not received from the first user equipment on a second resource of the plurality of periodic resources.

In some examples, the condition may include a signal strength condition. In some examples, to selectively receive the data, the base station may receive the data on the at least one first resource when a measured signal strength is greater than a threshold associated with the signal strength condition. In some examples, to selectively receive the data, the base station may determine that a measured signal strength is greater than a threshold associated with the signal strength condition, and receive the data on the at least one first resource responsive to the determination that the measured signal strength is greater than the threshold associated with the signal strength condition.

In some examples, the condition may include a first signal strength condition and a second signal strength condition. In some examples, to selectively receive the data, the base station may receive the data on the at least one first resource when a measured signal strength is greater than a threshold associated with the first signal strength condition. In some examples, to selectively receive the data, the base station may determine that a measured signal strength is greater than a threshold associated with the first signal strength condition, and receive the data on the at least one first resource responsive to the determination that the measured signal strength is greater than the threshold associated with the first signal strength condition. In some examples, the base station may receive the data on a second resource of the plurality of periodic resources when a measured signal strength is less than a first threshold associated with the first signal strength condition and greater than a second threshold associated with the second signal strength condition. In some examples, to selectively receive the data, the base station may determine that a measured signal strength is less than a first threshold associated with the first signal strength condition and greater than a second threshold associated with the second signal strength condition, and receive the data on the at least one first resource responsive to the determination that the measured signal strength is less than the first threshold associated with the first signal strength condition and greater than the second threshold associated with the second signal strength condition.

In some examples, the condition is associated with a communication between the first user equipment and the base station. In some examples, to selectively receive the data, the base station may transmit to a second base station an indication of a failure of the communication between the first user equipment and the base station. In some examples, the base station is a master node for a dual connectivity mode of operation for the first user equipment, and the second base station is a secondary node for the dual connectivity mode of operation for the first user equipment.

In some examples, the condition is associated with a communication between the first user equipment and a sidelink device. In some examples, to selectively receive the data, the base station may receive an indication of a failure of the communication between the first user equipment and the sidelink device, receive the data from the first user equipment on the at least one first resource, and forward the data to the sidelink device.

In some examples, the condition may include a channel condition associated with a communication between the first user equipment and a wireless communication device. In some examples, to selectively receive the data, the base station may receive an indication that the channel condition makes unacceptable (is unacceptable for) the communication between the first user equipment and the wireless communication device, receive the data from the first user equipment on the at least one first resource, and forward the data to the wireless communication device.

In some examples, the condition may include a first condition and a second condition. In some examples, to selectively receive the data, the base station may receive the data on the at least one first resource when the first condition is met, or receive the data on a second resource of the plurality of periodic resources when the second condition is met.

In some examples, to selectively receive the data, the base station may identify a potential data transmission collision between the first user equipment and a second user equipment on the at least one first resource, cancel a first transmission by the second user equipment on the at least one first resource, transmit an indication to the second user equipment scheduling the first transmission on a second resource of the plurality of periodic resources, and receive the data from the first user equipment on the at least one first resource. In some examples, to selectively receive the data, the base station may identify a potential data transmission collision between the first user equipment and a second user equipment on the at least one first resource, transmit group downlink control information specifying that the first user equipment is to use the at least one first resource and the second user equipment is to use a second resource of the plurality of periodic resources, receive the data from the first user equipment on the at least one first resource, and receive second data from the second user equipment on the second resource.

The methods shown in FIGS. 12-15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving scheduling information allocating a plurality of periodic resources for the user equipment; receiving an indication of a condition that controls use of the plurality of periodic resources; and selectively transmitting data on at least one first resource of the plurality of periodic resources based on whether the condition is met.

Aspect 2: The method of aspect 1, wherein the data is a retransmission of an attempted first transmission on a second resource of the plurality of periodic resources.

Aspect 3: The method of aspect 1 or 2, wherein, to selectively transmit the data, the method further includes: transmitting the data on the at least one first resource when the condition is met; transmit the data on a specified number of resources of the at least one first resource until; transmit the data on the at least one first resource until the condition is deactivated; or abstain from transmitting the data on the at least one first resource when the condition is not met.

Aspect 4: The method of any of aspects 1 through 3, wherein the condition comprises at least one of: an application survival time condition, a listen-before talk condition, a signal strength condition, a cell connectivity condition, a sidelink connectivity condition, a channel condition, a payload condition, or a combination thereof.

Aspect 5: The method of any of aspects 1 through 4, wherein: the condition is associated with an application survival time; and to selectively transmit the data, the method further comprises transmitting the data on the at least one first resource prior to expiry of a timer associated with the application survival time.

Aspect 6: The method of any of aspects 1 through 4, wherein: the condition comprises a listen-before talk condition; and to selectively transmit the data, the method further includes transmitting the data on the at least one first resource responsive to a listen-before talk failure.

Aspect 7: The method of any of aspects 1 through 4, wherein: the condition comprises a signal strength condition; and to selectively transmit the data, the method further includes determining that a measured signal strength is greater than a threshold associated with the signal strength condition, and transmit the data on the at least one first resource responsive to the determination that the measured signal strength is greater than the threshold associated with the signal strength condition.

Aspect 8: The method of any of aspects 1 through 4, wherein: the condition comprises a first signal strength condition and a second signal strength condition; and to selectively transmit the data, the method further includes determining that a measured signal strength is greater than a threshold associated with the first signal strength condition, and transmit the data on the at least one first resource responsive to the determination that the measured signal strength is greater than the threshold associated with the first signal strength condition.

Aspect 9: The method of any of aspects 1 through 4, wherein: the condition comprises a first signal strength condition and a second signal strength condition; and to selectively transmit the data, the method further includes determining that a measured signal strength is less than a first threshold associated with the first signal strength condition and greater than a second threshold associated with the second signal strength condition, and transmit the data on a second resource of the plurality of periodic resources responsive to the determination that the measured signal strength is less than the first threshold associated with the first signal strength condition and greater than the second threshold associated with the second signal strength condition.

Aspect 10: The method of any of aspects 1 through 4, wherein: the condition is associated with a communication between the user equipment and a first cell; and to selectively transmit the data, the method further includes transmitting the data on the at least one first resource to a second cell when there is a failure of the communication between the user equipment and the first cell.

Aspect 11: The method of aspect 10, wherein: the first cell is a master node for a dual connectivity mode of operation for the user equipment, the first cell is for a packet data convergence protocol (PDCP) duplication mode of operation for the user equipment, or the first cell is for a carrier aggregation mode of operation for the user equipment; and the second cell is a secondary node for the dual connectivity mode of operation for the user equipment, the second cell is for the packet data convergence protocol (PDCP) duplication mode of operation for the user equipment, or the second cell is for the carrier aggregation mode of operation for the user equipment.

Aspect 12: The method of any of aspects 1 through 4, wherein: the condition is associated with a communication between the user equipment and a sidelink device; and to selectively transmit the data, the method further includes transmitting the data on the at least one first resource to a serving base station of the user equipment when there is a failure of the communication between the user equipment and the sidelink device.

Aspect 13: The method of any of aspects 1 through 12, wherein the condition comprises a channel condition associated with a communication between the user equipment and a wireless communication device.

Aspect 14: The method of aspect 13, wherein, to selectively transmit the data, the method further includes: transmitting the data on the at least one first resource to a serving base station of the user equipment for forwarding the data to the wireless communication device when the channel condition makes unacceptable the communication between the user equipment and the wireless communication device.

Aspect 15: The method of aspect 14, further comprising: selectively receiving second data based on whether the condition is met.

Aspect 16: The method of aspect 14, wherein, to selectively transmit the data, the method further includes: transmitting the data on the at least one first resource to the wireless communication device when the channel condition makes acceptable the communication between the user equipment and the wireless communication device.

Aspect 17: The method of any of aspects 1 through 16, wherein: the condition comprises a first condition and a second condition; and to selectively transmit the data, the method further includes transmitting the data on the at least one first resource when the first condition is met or transmit the data on a second resource of the plurality of periodic resources when the second condition is met.

Aspect 18: The method of any of aspects 1 through 17, wherein: the method further includes receiving group downlink control information specifying that the user equipment is to use the at least one first resource; and to selectively transmit the data, the method further includes transmitting the data on the at least one first resource.

Aspect 20: A method for wireless communication at a base station, the method comprising: transmitting scheduling information allocating a plurality of periodic resources for a first user equipment; transmitting an indication of a condition that controls use of the plurality of periodic resources; and selectively receiving data on at least one first resource of the plurality of periodic resources based on whether the condition is met.

Aspect 21: The method of aspect 20, wherein, to selectively receive the data, the method further includes: receiving the data on the at least one first resource when the condition is met; receive the data on a specified number of resources of the at least one first resource; receive the data on the at least one first resource until the condition is deactivated; or abstain from receiving the data on the at least one first resource when the condition is not met.

Aspect 22: The method of any of aspects 20 through 21, wherein the scheduling information comprises a conditional configured grant that allocates the plurality of periodic resources for the first user equipment.

Aspect 23: The method of any of aspects 20 through 22, further comprising transmitting a radio resource control message that includes the scheduling information and the indication; and the indication comprises a radio resource control configured grant condition information element.

Aspect 24: The method of any of aspects 20 through 23, wherein the condition comprises an application survival time condition or a listen-before talk condition.

Aspect 25: The method of aspect 24, wherein, to selectively receive the data, the method further includes: monitoring for the data on the at least one first resource when a data transmission is not received from the first user equipment on a second resource of the plurality of periodic resources.

Aspect 26: The method of any of aspects 20 through 25, wherein: the condition is associated with a communication between the first user equipment and a sidelink device; and to selectively receive the data, the method further includes receiving an indication of a failure of the communication between the first user equipment and the sidelink device, receive the data from the first user equipment on the at least one first resource, and forward the data to the sidelink device.

Aspect 27: The method of any of aspects 20 through 25, wherein: the condition comprises a channel condition associated with a communication between the first user equipment and a wireless communication device; and to selectively receive the data, the method further includes receiving an indication that the channel condition makes unacceptable the communication between the first user equipment and the wireless communication device, receive the data from the first user equipment on the at least one first resource, and forward the data to the wireless communication device.

Aspect 28: The method of any of aspects 20 through 25, wherein, to selectively receive the data, the method further includes: identifying a potential data transmission collision between the first user equipment and a second user equipment on the at least one first resource; cancel a first transmission by the second user equipment on the at least one first resource; transmit an indication to the second user equipment scheduling the first transmission on a second resource of the plurality of periodic resources; and receive the data from the first user equipment on the at least one first resource.

Aspect 29: The method of any of aspects 20 through 25, wherein, to selectively receive the data, the method further includes: identifying a potential data transmission collision between the first user equipment and a second user equipment on the at least one first resource; transmit group downlink control information specifying that the first user equipment is to use the at least one first resource and the second user equipment is to use a second resource of the plurality of periodic resources; receive the data from the first user equipment on the at least one first resource; and receive second data from the second user equipment on the second resource.

Aspect 30: A user equipment comprising: a transceiver configured to communicate with a radio access network, a memory, and a processor communicatively coupled to the transceiver and the memory, wherein the processor and the memory are configured to perform any one of aspects 1 through 18.

Aspect 31: An apparatus configured for wireless communication comprising at least one means for performing any one of aspects 1 through 18.

Aspect 32: A non-transitory computer-readable medium storing computer-executable code, comprising code for causing an apparatus to perform any one of aspects 1 through 18.

Aspect 33: A base station comprising: a transceiver, a memory, and a processor communicatively coupled to the transceiver and the memory, wherein the processor and the memory are configured to perform any one of aspects 20 through 29.

Aspect 34: An apparatus configured for wireless communication comprising at least one means for performing any one of aspects 20 through 29.

Aspect 35: A non-transitory computer-readable medium storing computer-executable code, comprising code for causing an apparatus to perform any one of aspects 20 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-30 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-10, 14, 17-19, 24-27, and 29 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver;
one or more memories storing processor-executable code; and
one or more processors configured to execute the processor-executable code and cause the user equipment to:
receive, via the transceiver, scheduling information comprising a configured grant that conditionally allocates a plurality of periodic configured grant occasions for the user equipment;
receive, via the transceiver, an indication of at least one condition that controls use of the plurality of periodic configured grant occasions conditionally allocated by the configured grant;
activate a first configured grant occasion of the plurality of periodic configured grant occasions when a first condition of the at least one condition is met;
transmit, via the transceiver, data for a first transmission on the first configured grant occasion of the plurality of periodic configured grant occasions when the first configured grant occasion is activated;
selectively activate at least one second configured grant occasion of the plurality of periodic configured grant occasions according to whether the first condition or a second condition of the at least one condition is met, the at least one second configured grant occasion being different from the first configured grant occasion; and
selectively retransmit the data, via the transceiver, on the at least one second configured grant occasion when the at least one second configured grant occasion is activated.

2. The user equipment of claim 1, wherein, to selectively retransmit the data, the one or more processors are further configured to execute the processor-executable code and cause the user equipment to:

retransmit the data on the at least one second configured grant occasion when the second condition is met;

retransmit the data on a specified number of configured grant occasions of the at least one second configured grant occasion;

retransmit the data on the at least one second configured grant occasion until the second condition is deactivated; or abstain from retransmitting the data on the at least one second configured grant occasion when the second condition is not met.

3. The user equipment of claim 1, wherein each of the first condition and the second condition comprises at least one of: an application survival time condition, a listen-before talk condition, a signal strength condition, a cell connectivity condition, a sidelink connectivity condition, a channel condition, a payload condition, or a combination thereof.

4. The user equipment of claim 1, wherein:

the second condition is associated with an application survival time; and to selectively retransmit the data, the one or more processors are further configured to execute the processor-executable code and cause the user equipment to retransmit the data on the at least one second configured grant occasion prior to expiry of a timer associated with the application survival time.

5. The user equipment of claim 1, wherein:

the at least one condition comprises a third condition; and to selectively retransmit the data, the one or more processors are further configured to execute the processor-executable code and cause the user equipment to retransmit the data on the at least one second configured grant occasion when the second condition is met or transmit the data on a third configured grant occasion of the plurality of periodic configured grant occasions when the third condition is met.

6. The user equipment of claim 1, wherein:

the one or more processors are further configured to execute the processor-executable code and cause the user equipment to receive group downlink control information specifying that the user equipment is to use the at least one second configured grant occasion; and to selectively retransmit the data, the one or more processors are further configured to execute the processor-executable code and cause the user equipment to retransmit the data on the at least one second configured grant occasion.

7. The user equipment of claim 1, wherein the one or more processors are further configured to execute the processor-executable code and cause the user equipment to:

receive, via the transceiver, an uplink cancellation indication that cancels a third configured grant occasion of the plurality of periodic configured grant occasions; and abstain from transmitting on the third configured grant occasion in accordance with the uplink cancellation indication.

8. The user equipment of claim 1, wherein the one or more processors are further configured to execute the processor-executable code and cause the user equipment to:

receive, via the transceiver, a second indication of a third condition that controls use of the plurality of periodic configured grant occasions conditionally allocated by the configured grant;

activate a third configured grant occasion of the plurality of periodic configured grant occasions when the third condition is met;

transmit, via the transceiver, data for a second transmission on a third configured grant occasion of the plurality of periodic configured grant occasions when the third configured grant occasion is activated;

selectively activate at least one fourth configured grant occasion of the plurality of periodic configured grant occasions according to whether the third condition is met, the at least one fourth configured grant occasion being different from the third configured grant occasion; and selectively retransmit the data, via the transceiver, on the at least one fourth configured grant occasion when the at least one fourth configured grant occasion is activated.

9. The user equipment of claim 1, wherein the second condition corresponds at least in part to whether a retransmission is needed.

10. A method for wireless communication at a user equipment, the method comprising:

receiving scheduling information comprising a configured grant that conditionally allocates a plurality of periodic configured grant occasions for the user equipment;

receiving an indication of at least one condition that controls use of the plurality of periodic configured grant occasions conditionally allocated by the configured grant;

activating a first configured grant occasion of the plurality of periodic configured grant occasions when a first condition of the at least one condition is met;

transmitting data for a first transmission on the first configured grant occasion of the plurality of periodic configured grant occasions when the first configured grant occasion is activated;

selectively activating at least one second configured grant occasion of the plurality of periodic configured grant occasions according to whether the first condition or a second condition of the at least one condition is met, the at least one second configured grant occasion being different from the first configured grant occasion; and selectively retransmitting the data on the at least one second configured grant occasion when the at least one second configured grant occasion is activated.

11. A network entity, comprising:

a transceiver;

one or more memories storing processor-executable code; and one or more processors configured to execute the processor-executable code and cause the network entity to:

transmit, via the transceiver, scheduling information comprising a configured grant that conditionally allocates a plurality of periodic configured grant occasions for a first user equipment;

transmit, via the transceiver, an indication of at least one condition that controls use of the plurality of periodic configured grant occasions conditionally allocated by the configured grant;

monitor for a first transmission from the first user equipment on a first configured grant occasion of the plurality of periodic configured grant occasions according to a determination that the first user equipment activated the first configured grant occasion responsive to a first condition of the at least one condition being met; and selectively receive data for at least one retransmission of the first transmission, via the transceiver, on at least one second configured grant occasion of the plurality of periodic configured grant occasions according to a determination that the first user equipment activated the at least one second configured grant occasion responsive to the first condition or a second condition of the at least one condition being met, the at least one second configured grant occasion being different from the first configured grant occasion.

12. The network entity of claim 11, wherein, to selectively receive the data, the one or more processors are further configured to execute the processor-executable code and cause the network entity to:
  receive the data on the at least one second configured grant occasion when the second condition is met;
  receive the data on a specified number of configured grant occasions of the at least one second configured grant occasion;
  receive the data on the at least one second configured grant occasion until the second condition is deactivated; or
  abstain from receiving the data on the at least one second configured grant occasion when the second condition is not met.

13. The network entity of claim 11, wherein:
  the one or more processors are further configured to execute the processor-executable code and cause the network entity to transmit a radio resource control message that includes the scheduling information and the indication; and
  the indication comprises a radio resource control configured grant condition information element.

14. The network entity of claim 11, wherein the at least one condition comprises an application survival time condition or a listen-before talk condition.

15. The network entity of claim 14, wherein, to selectively receive the data, the one or more processors are further configured to execute the processor-executable code and cause the network entity to:
  monitor for the data on the at least one second configured grant occasion when the first transmission is not received from the first user equipment on the first configured grant occasion of the plurality of periodic configured grant occasions.

16. The network entity of claim 11, wherein, to selectively receive the data the one or more processors are further configured to execute the processor-executable code and cause the network entity to:
  identify a potential data transmission collision between the first user equipment and a second user equipment on the at least one second configured grant occasion;
  cancel a second transmission by the second user equipment on the at least one second configured grant occasion;
  transmit second scheduling information to the second user equipment the second scheduling information scheduling the second transmission on a third configured grant occasion of the plurality of periodic configured grant occasions; and
  receive the data from the first user equipment on the at least one second configured grant occasion.

17. The network entity of claim 11, wherein, to selectively receive the data, the one or more processors are further configured to execute the processor-executable code and cause the network entity to:
  identify a potential data transmission collision between the first user equipment and a second user equipment on the at least one second configured grant occasion;
  transmit group downlink control information specifying that the first user equipment is to use the at least one second configured grant occasion and the second user equipment is to use a third configured grant occasion of the plurality of periodic configured grant occasions;
  receive the data from the first user equipment on the at least one second configured grant occasion; and
  receive second data from the second user equipment on the third configured grant occasion.

18. The network entity of claim 11, wherein the one or more processors are further configured to execute the processor-executable code and cause the network entity to:
  identify a potential data transmission collision between the first user equipment and a second user equipment on a third configured grant occasion of the plurality of periodic configured grant occasions; and
  transmit, via the transceiver, an uplink cancellation indication that cancels the third configured grant occasion of the plurality of periodic configured grant occasions for the first user equipment.

19. The network entity of claim 11, wherein the one or more processors are further configured to execute the processor-executable code and cause the network entity to:
  allocate at least one third configured grant occasion of the plurality of periodic configured grant occasions for a second user equipment according to a determination that the first user equipment did not activate the at least one third configured grant occasion responsive to the second condition not being met; and
  transmit, to the second user equipment via the transceiver, an indication of the allocation of the at least one third configured grant occasion of the plurality of periodic configured grant occasions for the second user equipment.

20. The network entity of claim 11, wherein the second condition corresponds at least in part to whether a retransmission is needed.

21. A method for wireless communication at a network entity, the method comprising:
  transmitting scheduling information comprising a configured grant that conditionally allocates a plurality of periodic configured grant occasions for a first user equipment;
  transmitting an indication of at least one condition that controls use of the plurality of periodic configured grant occasions conditionally allocated by the configured grant;
  monitoring for a first transmission from the first user equipment on a first configured grant occasion of the plurality of periodic configured grant occasions according to a determination that the first user equipment activated the first configured grant occasion responsive to a first condition of the at least one condition being met; and
  selectively receiving data for at least one retransmission of the first transmission on at least one second configured grant occasion of the plurality of periodic configured grant occasions according to a determination that the first user equipment activated the at least one second configured grant occasion responsive to the first condition or a second condition of the at least one condition being met, the at least one second configured grant occasion being different from the first configured grant occasion.

* * * * *